(12) United States Patent
Tan et al.

(10) Patent No.: US 12,254,181 B2
(45) Date of Patent: Mar. 18, 2025

(54) MEMORY SYSTEM CONTROLLER, MEMORY AND OPERATION METHODS THEREOF, AND ELECTRONIC DEVICE

(71) Applicant: Yangtze Memory Technologies Co., Ltd., Hubei (CN)

(72) Inventors: Hua Tan, Hubei (CN); Yaolong Gao, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 187 days.

(21) Appl. No.: 18/091,117

(22) Filed: Dec. 29, 2022

(65) Prior Publication Data

US 2024/0168633 A1    May 23, 2024

Related U.S. Application Data

(63) Continuation of application No. PCT/CN2022/133014, filed on Nov. 18, 2022.

(51) Int. Cl.
    *G06F 3/06*     (2006.01)

(52) U.S. Cl.
    CPC ............ *G06F 3/061* (2013.01); *G06F 3/0656* (2013.01); *G06F 3/0659* (2013.01); *G06F 3/0679* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 4,151,611 | A | * | 4/1979 | Sugawara ............... G11C 17/08 365/229 |
| 2007/0263441 | A1 | * | 11/2007 | Cornwell ........... G11C 16/0483 714/E11.038 |
| 2016/0098319 | A1 | * | 4/2016 | Gorobets ............... G11C 16/10 714/773 |
| 2016/0217835 | A1 | * | 7/2016 | Blott ................... G06F 13/1694 |

(Continued)

FOREIGN PATENT DOCUMENTS

| | | |
|---|---|---|
| CN | 115331721 A | 11/2022 |
| TW | 1722613 B | 3/2021 |

OTHER PUBLICATIONS

Taiwanese Office Action issued on Jan. 29, 2024 in the corresponding Taiwanese Application No. 112124169, 3 pages.

(Continued)

*Primary Examiner* — Tan T. Nguyen
(74) *Attorney, Agent, or Firm* — Oblon, McClelland, Maier & Neustadt, L.L.P.

(57) ABSTRACT

Aspects of the disclosure are directed to a memory system that can include a controller and a memory coupled thereto, each memory cell of the memory is configured to store m-bit information, and the controller includes at least one of an exclusive OR circuit, an inverter and an access circuit. The controller is configured to receive n groups of logic page data, and generate, at different values of m and n, at least one group of logic page data selectively by at least one of the exclusive OR circuit, the inverter and the access circuit. The controller is further configured to transmit the m groups of logic page data to the memory to generate 2n different data states in the memory.

20 Claims, 8 Drawing Sheets

(56) References Cited

U.S. PATENT DOCUMENTS

2022/0189544 A1     6/2022   Nguyen et al.

OTHER PUBLICATIONS

Combined Chinese Office Action and Search Report issued on Jul. 30, 2023, in the international Application No. PCT/CN2022/133014 (with Translation of Category of Cited Documents), 4 pages.
The extended European search report dated Nov. 7, 2024, includes the supplementary European search report and the European search opinion, for European Patent Application No. 22871068.7, 10 pages.

* cited by examiner

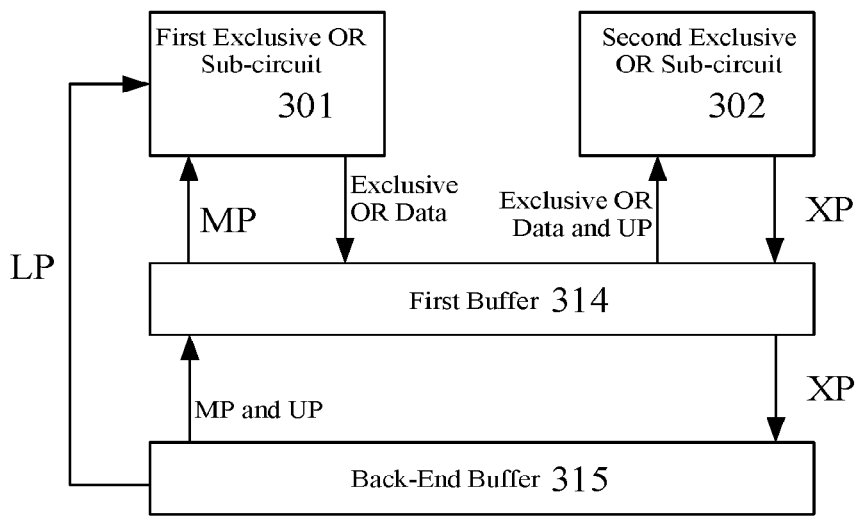
Fig. 12
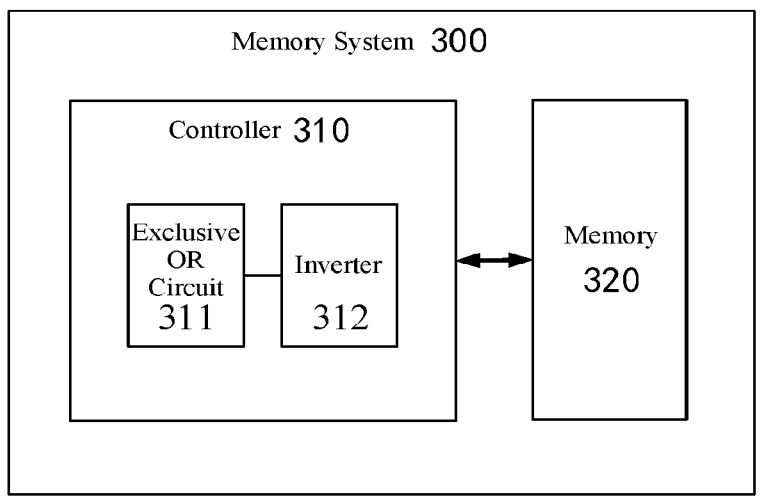
Fig. 13
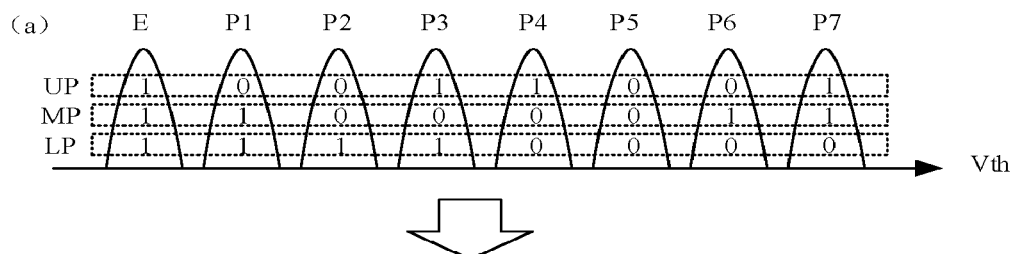
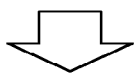
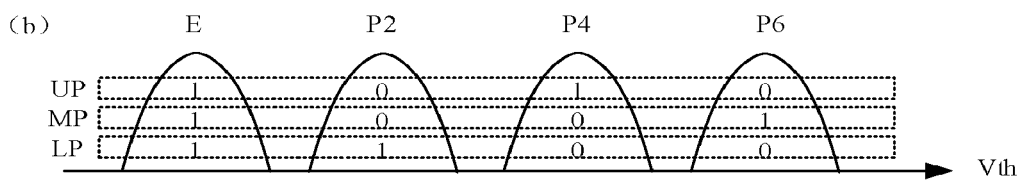
Fig. 14

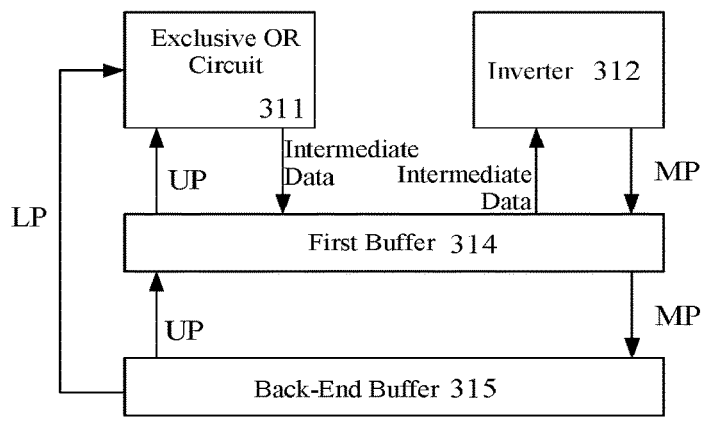

Fig. 15

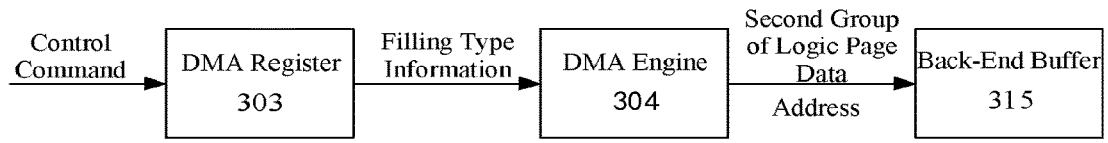

Fig. 16

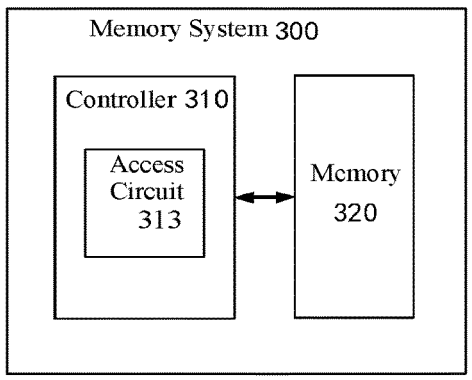

Fig. 17

Receive n groups of logic page data, and generating, at different values of m and n, at least one group of logic page data selectively by at least one of an exclusive OR circuit, an inverter and an access circuit, wherein n being a positive integer and being less than m — S210

Transmit m groups of logic page data to a memory to generate 2n different data states in the memory, the m groups of logic page data comprising the n groups of logic page data and the at least one group of logic page data, and the m groups of logic page data comprising m-bit information of a group of memory cells — S220

Fig. 18

MEMORY SYSTEM CONTROLLER, MEMORY AND OPERATION METHODS THEREOF, AND ELECTRONIC DEVICE

INCORPORATION BY REFERENCE

This present disclosure claims the benefit of International Patent Disclosure No. PCT/CN2022/133014, filed on Nov. 18, 2022, which is incorporated herein by reference in its entirety.

BACKGROUND

Field of the Invention

Embodiments of the present disclosure relate to, but are not limited to, the field of semiconductors, and in particular, to a memory system, a controller, a memory and operation methods thereof, and an electronic device.

Description of the Related Art

With the development of flash memory devices (NAND) of computers, the number of bits stored in a memory cell in this type of memories has increased from 1 bit to 2 bits, 3 bits or 4 bits, etc. Accordingly, the memory cell has evolved from a Single Level Cell (SLC) to a Multiple Level Cell (MLC), a Triple Level Cell (TLC), or a Quad-Level Cell (QLC). The greater the number of bits a memory cell of the memory stores, the larger its storage capacity and the lower its cost, while its write speed is slower and is less reliable.

Currently, in some disclosures, a NAND memory is required to combine both the fast write speed and high reliability of a single level cell and the high storage capacity and low cost of a multiple level cell. Therefore, how to flexibly configure the NAND memory to enable the same to implement multiple memory cell modes has become a technical problem to be solved.

SUMMARY

In view of this, embodiments of the present disclosure provide a memory system, a controller, a memory and operation methods thereof, and an electronic device, solving the problem of difficulty in flexibly configuring a NAND memory to enable the same to implement multiple memory cell modes.

In a first aspect of the disclosure, a memory system is provided that can include a controller and a memory coupled to the controller, and each memory cell of the memory being used for storing m-bit information, wherein m being a positive integer greater than 1. The controller can include at least one of an exclusive OR circuit, an inverter and an access circuit. The controller is used for receiving n groups of logic page data, and generating, at different values of m and n, at least one group of logic page data selectively by the at least one of the exclusive OR circuit, the inverter and the access circuit, wherein n being a positive integer different from m. The controller is further used for transmitting m groups of logic page data to the memory to generate 2n different data states in the memory, the m groups of logic page data including the n groups of logic page data and the at least one group of logic page data, and the m groups of logic page data including m-bit information of a group of memory cells. Exemplarily, n is less than m.

In the above technical solution, the controller is used for generating at least one group of logic page data selectively by the at least one of the exclusive OR circuit, the inverter and the access circuit, and transmitting the at least one group of logic page data and the n groups of logic page data received to the memory to generate 2n different data states in the memory, that is, a part of memory space of the memory may be used as at least one of an SLC, an MLC, a TLC and a QLC. In this way, the NAND memory can be flexibly configured to enable the same to implement multiple memory cell modes, and can simultaneously have the advantages of fast write speed, high reliability, high storage capacity and low cost and the like.

Further, compared with having the Central Processing Unit (CPU) in the controller perform logical operations, in the embodiments of the present disclosure, it is a simpler scheme that generates the at least one group of logic page data by the at least one of hardware modules such as the exclusive OR circuit, the inverter, the access circuit and the like in the controller. While multiple memory cell modes are implemented, it helps to improve the operational efficiency of the memory system. Moreover, compared with the scheme of developing a universal NAND memory, the scheme in which the memory system provided by the embodiments of the present disclosure uses the hardware modules is more friendly, and can be compatible with the existing NAND protocol, thereby being helpful to reduce the development costs.

In one possible implementation of the first aspect, the exclusive OR circuit includes a redundant arrays of independent disks (RAID) exclusive OR circuit in the controller. In the above possible implementation, an original redundant arrays of independent disks (RAID) exclusive OR circuit is reused without adding a new exclusive OR circuit in the controller. Therefore, the at least one group of logic page data can be generated at a lower hardware cost. A foundation is provided for implementing multiple memory cell modes of the memory and improving the operation efficiency of the memory system.

In one possible implementation of the first aspect, the access circuit includes a direct memory access circuit in the controller. In the above possible implementation, an original direct memory access (DMA) circuit is reused without adding a new access circuit in the controller. Therefore, the at least one group of logic page data can be generated at a lower hardware cost. A foundation is provided for implementing multiple memory cell modes of the memory and improving the operation efficiency of the memory system.

In one possible implementation of the first aspect, the circuit selected by the controller includes the exclusive OR circuit, and the controller being used for performing an exclusive OR operation on the n groups of logic page data by the exclusive OR circuit to obtain a first group of logic page data. In the above possible implementation, the controller is used for performing an exclusive OR operation on the n groups of logic page data by the exclusive OR circuit to obtain a first group of logic page data, and transmitting the n groups of logic page data and the at least one group of logic page data to the memory to generate 2n different data states in the memory. For example, when the memory is a QLC, a part of memory space of the QLC memory may be used as a TLC. In this way, the memory has at least two memory cell modes, which is conducive to increasing the disclosure scenarios of the memory, and can better meet customer requirements while being compatible with mainstream memories. Further, compared with having the CPU in the controller perform logical operations, in the embodiments of the present disclosure, it is a simpler scheme that generates the first group of logic page data by the hardware modules such as the exclusive OR circuit in the controller. While multiple memory cell modes are implemented, it helps to improve the operational efficiency of the memory system. Moreover, compared with the scheme of developing a universal NAND memory, the scheme in which the memory system provided by the embodiments of the present disclosure uses the hardware modules is more friendly, and can be compatible with the existing NAND protocol, thereby being helpful to reduce the development costs.

In one possible implementation of the first aspect, the circuit selected by the controller includes the exclusive OR circuit and the inverter, and the controller being used for performing an exclusive OR operation on the n groups of logic page data by the exclusive OR circuit to obtain intermediate data, and performing a NOT operation on the intermediate data by the inverter to obtain the first group of logic page data. In the above possible implementation, the controller is used for performing operations on the n groups of logic page data by the exclusive OR circuit and the inverter to obtain the first group of logic page data, and transmitting the n groups of logic page data and the first group of logic page data to the memory to generate 2n different data states in the memory. For example, when the memory is a TLC, a part of memory space of the TLC memory may be used as a MLC. In this way, the memory has at least two memory cell modes, which is conducive to increasing the disclosure scenarios of the memory, and can better meet customer requirements while being compatible with mainstream memories. Further, compared with having the CPU in the controller perform logical operations, in the embodiments of the present disclosure, it is a simpler scheme that generates the first group of logic page data by the hardware modules such as the exclusive OR circuit and the inverter in the controller. While multiple memory cell modes are implemented, it helps to improve the operational efficiency of the memory system. Moreover, compared with the scheme of developing a universal NAND memory, the scheme in which the memory system provided by the embodiments of the present disclosure uses the hardware modules is more friendly, and can be compatible with the existing NAND protocol, thereby being helpful to reduce the development costs.

In one possible implementation of the first aspect, the circuit selected by the controller further includes the access circuit, and the controller being further used for determining a filling type of a second group of logic page data by the access circuit and determining the second group of logic page data from the filling type. In the above possible implementation, the controller is further used for determining the second group of logic page data by the access circuit, and transmitting the n groups of logic page data, the first group of logic page data and the second group of logic page data to the memory to generate 2n different data states in the memory. In this way, the memory has at least two memory cell modes, which is conducive to increasing the disclosure scenarios of the memory, and can better meet customer requirements while being compatible with mainstream memories. Further, compared with having the CPU in the controller perform logical operations, in the embodiments of the present disclosure, it is a simpler scheme that generates the first group of logic page data by the hardware modules such as the exclusive OR circuit, the inverter, and the access circuit in the controller. While multiple memory cell modes are implemented, it helps to improve the operational efficiency of the memory system. Moreover, compared with the scheme of developing a universal NAND memory, the scheme in which the memory system provided by the embodiments of the present disclosure uses the hardware modules is more friendly, and can be compatible with the existing NAND protocol, thereby being helpful to reduce the development costs.

In one possible implementation of the first aspect, the circuit selected by the controller includes the access circuit, and the controller being used for copying a group of logic page data in the n groups of logic page data by the access circuit to obtain a first group of logic page data. In the above possible implementation, in the embodiments of the present disclosure, the controller is used for performing a copy operation on the n groups of logic page data by the access circuit to obtain the first group of logic page data, and transmitting the n groups of logic page data and the first group of logic page data to the memory to generate 2n different data states in the memory. In this way, the memory has at least two memory cell modes, which is conducive to increasing the disclosure scenarios of the memory, and can better meet customer requirements while being compatible with mainstream memories. Further, compared with having the CPU in the controller perform logical operations, in the embodiments of the present disclosure, it is a simpler scheme that generates the first group of logic page data by the hardware modules such as the access circuit in the controller. While multiple memory cell modes are implemented, it helps to improve the operational efficiency of the memory system. Moreover, compared with the scheme of developing a universal NAND memory, the scheme in which the memory system provided by the embodiments of the present disclosure uses the hardware modules is more friendly, and can be compatible with the existing NAND protocol, thereby being helpful to reduce the development costs.

In one possible implementation of the first aspect, the controller is further used for determining a filling type of a second group of logic page data by the access circuit and determining the second group of logic page data from the filling type. In the above possible implementation, in the embodiments of the present disclosure, the controller is further used for determining the second group of logic page data by the access circuit, and transmitting the n groups of logic page data, the first group of logic page data and the second group of logic page data to the memory to generate 2n different data states in the memory. In this way, the memory has at least two memory cell modes, which is conducive to increasing the disclosure scenarios of the memory, and can better meet customer requirements while being compatible with mainstream memories. Further, compared with having the CPU in the controller perform logical operations, in the embodiments of the present disclosure, it is a simpler scheme that generates the first group of logic page data by the hardware modules such as the access circuit in the controller. While multiple memory cell modes are implemented, it helps to improve the operational efficiency of the memory system. Moreover, compared with the scheme of developing a universal NAND memory, the scheme in which the memory system provided by the embodiments of the present disclosure uses the hardware modules is more friendly, and can be compatible with the existing NAND protocol, thereby being helpful to reduce the development costs.

In one possible implementation of the first aspect, the filling type includes one of an all 0 sequence or an all 1 sequence. In the above possible implementation, by filling the at least one group of logic page data with a sequence such as the all 0 sequence or the all 1 sequence, a foundation is provided for implementing multiple memory cell modes of the memory and improving the operation efficiency of the memory system.

In one possible implementation of the first aspect, the controller further includes a first buffer, and the controller is further used for storing at least one group of logic page data in the m groups of logic page data by the first buffer. In the above possible implementation, in the embodiments of the present disclosure, the controller further includes the first buffer, and the controller is configured for storing at least one group of logic page data in the m groups of logic page data by the first buffer, thereby a foundation is provided for implementing multiple memory cell modes of the memory and improving the operation efficiency of the memory system.

In one possible implementation of the first aspect, the first buffer includes a redundant arrays of independent disks (RAID) buffer in the controller. In the above possible implementation, an original redundant arrays of independent disks (RAID) buffer is reused without adding a new buffer in the controller. Therefore, the data in the process of generating the logic page data can be stored at a lower hardware cost. A foundation is provided for implementing multiple memory cell modes of the memory and improving the operation efficiency of the memory system.

In a second aspect, a controller is provided, the controller is coupled to a memory, and each memory cell of the memory being used for storing m-bit information, wherein m being a positive integer greater than 1, and the controller includes at least one of an exclusive OR circuit, an inverter and an access circuit. The controller can be used for receiving n groups of logic page data, and generating, at different values of m and n, at least one group of logic page data selectively by the at least one of the exclusive OR circuit, the inverter and the access circuit, wherein n being a positive integer and being less than m. The controller can be further used for transmitting m groups of logic page data to the memory to generate 2n different data states in the memory, the m groups of logic page data including the n groups of logic page data and the at least one group of logic page data, and the m groups of logic page data comprising m-bit information of a group of memory cells.

In one possible implementation of the second aspect, the exclusive OR circuit includes a redundant arrays of independent disks (RAID) exclusive OR circuit in the controller.

In one possible implementation of the second aspect, the access circuit includes a direct memory access circuit in the controller.

In one possible implementation of the second aspect, the circuit selected by the controller comprises the exclusive OR circuit, and the controller being used for performing an exclusive OR operation on the n groups of logic page data by the exclusive OR circuit to obtain a first group of logic page data.

In one possible implementation of the second aspect, the circuit selected by the controller includes the exclusive OR circuit and the inverter, and the controller being used for performing an exclusive OR operation on the n groups of logic page data by the exclusive OR circuit to obtain intermediate data, and performing a NOT operation on the intermediate data by the inverter to obtain the first group of logic page data.

In one possible implementation of the second aspect, the circuit selected by the controller further includes the access circuit, and the controller being further used for determining a filling type of a second group of logic page data by the access circuit and determining the second group of logic page data from the filling type.

In one possible implementation of the second aspect, the circuit selected by the controller includes the access circuit, and the controller being used for copying a group of logic page data in the n groups of logic page data by the access circuit to obtain a first group of logic page data.

In one possible implementation of the second aspect, the controller is further used for determining a filling type of a second group of logic page data by the access circuit and determining the second group of logic page data from the filling type.

In a third aspect, a memory is provided, the memory is coupled to a controller, and each memory cell of the memory being used for storing m-bit information, wherein m being a positive integer greater than 1, and the controller includes at least one of an exclusive OR circuit, an inverter and an access circuit. The memory is used for receiving m groups of logic page data sent by the controller, and generating 2n different data states according to the m groups of logic page data, wherein n being a positive integer different from m. Wherein, the m groups of logic page data comprise at least one group of logic page data and n groups of logic page data received by the controller, the m groups of logic page data includes m-bit information of a group of memory cells, and the at least one group of logic page data being generated by the controller, at different values of m and n, selectively by the at least one of the exclusive OR circuit, the inverter and the access circuit.

In one possible implementation of the third aspect, the memory is further used for receiving the m groups of logic page data, and generating 2m different data states according to the m groups of logic page data. In the above possible implementation, the conversion between multiple memory cell modes may be implemented, for example, a QLC memory is used as an MLC memory, and the conversion may also not be performed, for example, a QLC memory is used as a QLC memory. In this way, the memory has at least two memory cell modes, which is conducive to increasing the disclosure scenarios of the memory, and can better meet customer requirements while being compatible with mainstream memories.

In a fourth aspect, an operation method of a memory system is provided, the method is applied to a memory system including a controller and a memory coupled to the controller, and each memory cell of the memory being used for storing m-bit information, wherein m being a positive integer greater than 1. The method can include receiving n groups of logic page data, and generating, at different values of m and n, at least one group of logic page data selectively by at least one of an exclusive OR circuit, an inverter and an access circuit, wherein n being a positive integer different from m. Transmitting m groups of logic page data to the memory to generate 2n different data states in the memory, the m groups of logic page data including the n groups of logic page data and the at least one group of logic page data, and the m groups of logic page data comprising m-bit information of a group of memory cells. Exemplarily, n is less than m.

In one possible implementation of the fourth aspect, the exclusive OR circuit includes a redundant arrays of independent disks (RAID) exclusive OR circuit in the controller.

In one possible implementation of the fourth aspect, the access circuit includes a direct memory access circuit in the controller.

In one possible implementation of the fourth aspect, generating the at least one group of logic page data selectively by the at least one of the exclusive OR circuit, the inverter and the access circuit can include selecting the exclusive OR circuit, and performing an exclusive OR operation on the n groups of logic page data by the exclusive OR circuit to obtain a first group of logic page data.

In one possible implementation of the fourth aspect, generating the at least one group of logic page data selectively by the at least one of the exclusive OR circuit, the inverter and the access circuit can include selecting the exclusive OR circuit and the inverter, and performing an exclusive OR operation on the n groups of logic page data by the exclusive OR circuit to obtain intermediate data, and performing a NOT operation on the intermediate data by the inverter to obtain the first group of logic page data.

In one possible implementation of the fourth aspect, the method further includes further selecting the access circuit, and determining a filling type of a second group of logic page data by the access circuit and determining the second group of logic page data from the filling type.

In one possible implementation of the fourth aspect, generating the at least one group of logic page data selectively by the at least one of the exclusive OR circuit, the inverter and the access circuit comprises: selecting the access circuit, and copying a group of logic page data in then groups of logic page data by the access circuit to obtain a first group of logic page data.

In one possible implementation of the fourth aspect, the method further includes determining a filling type of a second group of logic page data by the access circuit and determining the second group of logic page data from the filling type.

In one possible implementation of the fourth aspect, the filling type includes one of an all 0 sequence or an all 1 sequence.

In one possible implementation of the fourth aspect, the controller further includes a first buffer, and the method further includes storing at least one group of logic page data in the m groups of logic page data by the first buffer.

In one possible implementation of the fourth aspect, the first buffer includes a redundant arrays of independent disks (RAID) buffer in the controller.

In a fifth aspect, an operation method of a memory is provided, each memory cell of the memory is used for storing m-bit information, wherein m being a positive integer greater than 1. The method can include receiving m groups of logic page data, and generating 2n different data states according to the m groups of logic page data, wherein n being a positive integer and being less than m; wherein, the m groups of logic page data comprise at least one group of logic page data and n groups of logic page data, the m groups of logic page data comprising m-bit information of a group of memory cells, and the at least one group of logic page data being generated, at different values of m and n, selectively by at least one of an exclusive OR circuit, an inverter and an access circuit.

In one possible implementation of the fifth aspect, the memory is further used for receiving the m groups of logic page data, and generating 2m different data states according to the m groups of logic page data.

In a sixth aspect, an electronic device is provided, and the electronic device includes the memory system provided by the first aspect described above or any of the possible implementations of the first aspect.

In yet another aspect of the present disclosure, a computer program product is provided, and when the computer program product runs on a computer, causes the computer to perform the operation method of the memory system provided by the third aspect or any of the possible implementations of the third aspect.

It should be understood that, any of the controller, memory, operation method of the memory system, operation method of the memory, or the computer program product provided above is applied to or cooperate with the memory system described above to implement corresponding functions. Therefore, the beneficial effects thereof can be achieved with reference to the beneficial effects in the corresponding methods provided above and are not repeated herein.

BRIEF DESCRIPTION OF THE DRAWINGS

Various exemplary embodiments of this disclosure that are proposed as examples will be described in detail with reference to the following figures, wherein like numerals reference like elements, and wherein:

FIG. 12 is a schematic diagram of a data flow direction of a memory system provided in an embodiment of the present disclosure;

FIG. 13 is a third schematic diagram of a structure of a memory system provided in an embodiment of the present disclosure;

FIG. 14 is a schematic diagram of write states of yet another memory;

FIG. 15 is a schematic diagram of another data flow direction of a memory system provided in an embodiment of the present disclosure;

FIG. 16 is a schematic diagram of an access circuit provided in an embodiment of the present disclosure;

FIG. 17 is a third schematic diagram of a structure of a memory system provided in an embodiment of the present disclosure;

FIG. 18 is a schematic diagram of a flow of an operation method of a memory system provided in an embodiment of the present disclosure;

DETAILED DESCRIPTION OF THE PREFERRED EMBODIMENTS

The technical solutions of the present disclosure will be further described in detail below in combination with the accompanying drawings and embodiments. While exemplary embodiments of the present disclosure are shown in the accompanying drawings, it should be understood, however, that the present disclosure can be implemented in various forms without being limited by the embodiments set forth herein. Rather, these embodiments are provided to enable a more thorough understanding of the present disclosure and to enable the scope of the present disclosure being completely conveyed to those skilled in the art.

The present disclosure is described more specifically by way of example in the following paragraphs with reference to the accompanying drawings. The advantages and features of the present disclosure will be more apparent according to the following description and claims. It is noted that the accompanying drawings are in a very simplified form and are in a non-precise scale, and are merely for the purpose of conveniently and clearly aiding in the illustration of embodiments of the present disclosure.

In the embodiments of the present disclosure, the terms "first", "second" and the like are used to distinguish similar objects, and are not necessarily used to describe a specific order or precedence order.

It should be noted that, the technical solutions described in the embodiments of the present disclosure can be combined with each other in any way without conflict.

Before introducing the embodiments of the present disclosure, an introductory description of the relevant technical terms involved in the present disclosure is first provided.

A memory may include a memory cell array and may have a three-dimensional (3D) array structure. The memory cell array may include a plurality of memory blocks, and each memory block may include a plurality of memory cells. The memory may store data in the memory blocks in a sequential order or a random order. The memory in the embodiments may include a computer flash memory device (NAND). The memory may receive a command (CMD), an address (ADD) and data (DATA) from a controller. The memory may receive the address sent by the controller, and perform an operation corresponding to the command on an area that is selected according to the address. For example, the memory may perform a writing operation (a programming operation), a reading operation and an erasing operation. During the programming operation, the memory may program the data into the area that is selected according to the address. During the reading operation, the memory may read data from the area that is selected according to the address. During the erasing operation, the memory may erase data stored in the area that is selected according to the address.

Figure 1:
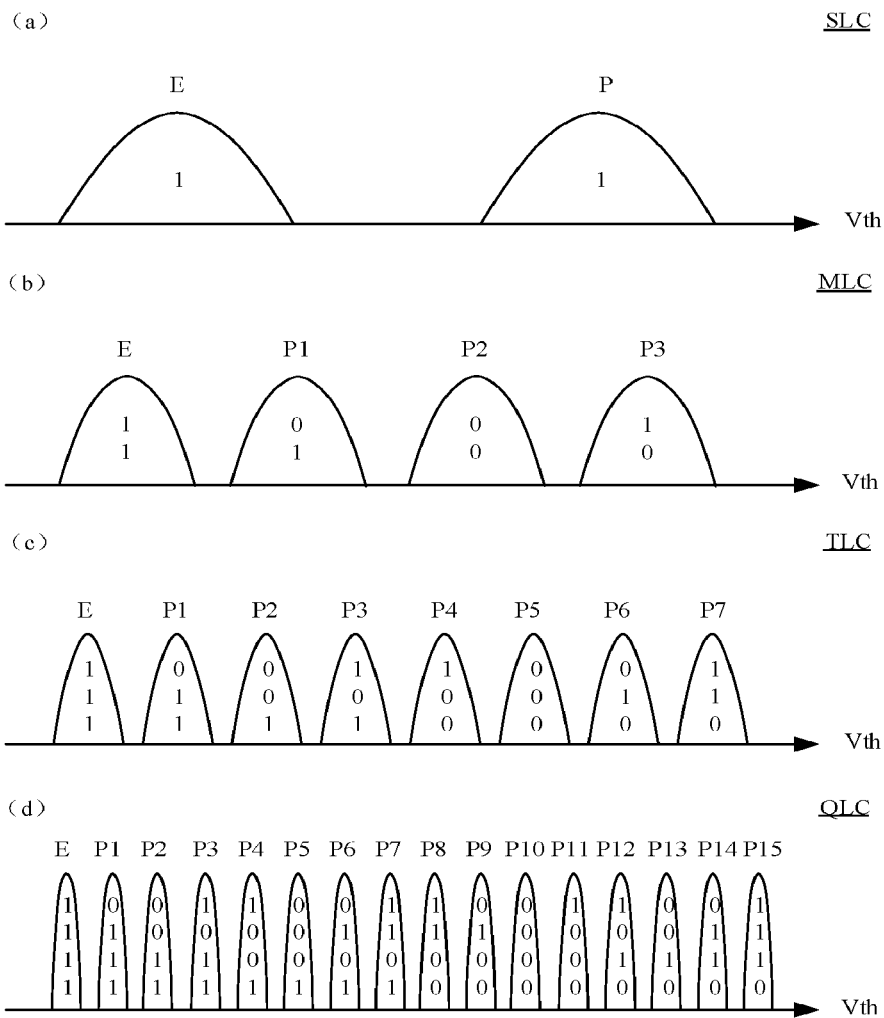
FIG. 1 is a schematic diagram of different data states of memories.

FIG. 1 is a schematic diagram of different data states of memories. As shown in FIG. 1, with the development of flash memory devices (NAND) of computers, the number of bits of a memory cell has increased from 1 bit to 2 bits, 3 bits or 4 bits, etc., and accordingly, the memory cell has evolved from a Single Level Cell (SLC) to a Multiple Level Cell (MLC), a Triple Level Cell (TLC), or a Quad-Level Cell (QLC), and accordingly, the data states in the memory have increased from 2 to 4, 8 or 16, such that the capacity of the memory is increased, and the cost is reduced.

As shown in FIG. 1(*a*), the memory cell of an SLC memory stores 1 bit of data, wherein the bit data may also be referred to as bit information. The data states of the SLC memory include one erased state denoted as E and one programmed state denoted as P, wherein Vth represents a threshold voltage, and the threshold voltage of the programmed state P is greater than the threshold voltage of the erased state E.

As shown in FIG. 1(*b*), the memory cell of an MLC memory stores 2 bits of data, and the data states of the MLC memory include one erased state denoted as E and three programmed states denoted as P1, P2 and P3 in sequence from the first state to the third state, and the threshold voltages gradually increase from the state P1 to the state P3.

As shown in FIG. 1(*c*), the memory cell of a TLC memory stores 3 bits of data, and the data states of the TLC memory include one erased state denoted as E and seven programmed states denoted as P1, P2, P3, P4, P5, P6 and P7 in sequence from the first state to the seventh state, and the threshold voltages gradually increase from the state P1 to the state P7.

As shown in FIG. 1(*d*), the memory cell of a QLC memory stores 4 bits of data, and the data states of the QLC memory include one erased state denoted as E and fifteen programmed states denoted as P1, P2, P3, P4, P5, P6, P7, P8, P9, P10, P11, P12, P13, P14 and P15 in sequence from the first state to the seventh state, and the threshold voltages gradually increase from the state P1 to the state P15.

Figure 2:
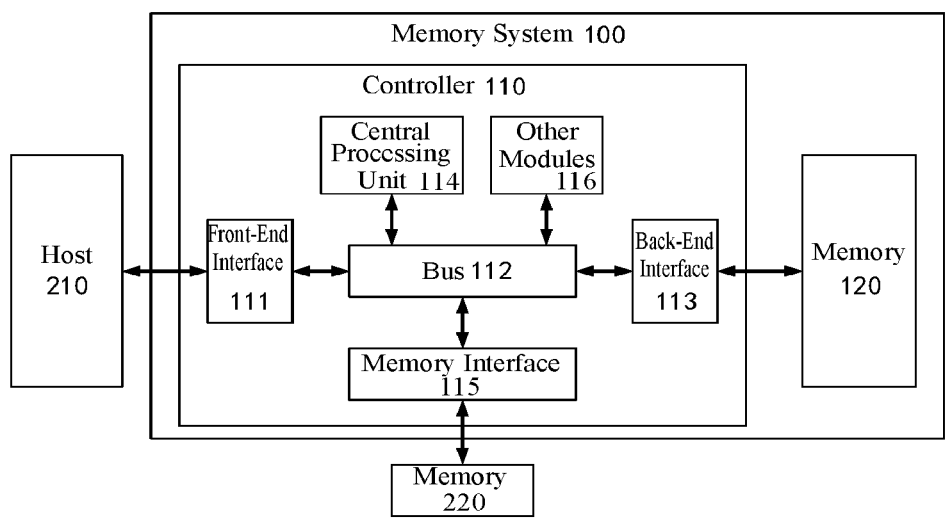
FIG. 2 is a schematic diagram of a structure of a memory system.

A memory system may include a controller and a memory coupled thereto. The controller may control general operations of the memory in response to a request received from a host. FIG. 2 shows a schematic diagram of a structure of a memory system, and the memory system 100 may include a controller 110 and a memory 120 coupled thereto. The controller 110 may include a front-end interface 111, a bus 112, a back-end interface 113, a central processing unit 114 (CPU), an memory interface 115, and other modules 116. Exemplarily, the bus 112 may be an advanced extensible interface (AXI) bus. The memory interface 115 may be a double data rate (DDR) memory interface. An memory 220 may be a synchronous dynamic random-access memory (SDRAM). The other modules 116 may include a write buffer, a read buffer, and the like. The memory system 100 may be coupled to a host 210 by the front-end interface 111 in the controller 110, and may be coupled to the memory 220 by the memory interface 115 in the controller 110.

Figure 3:
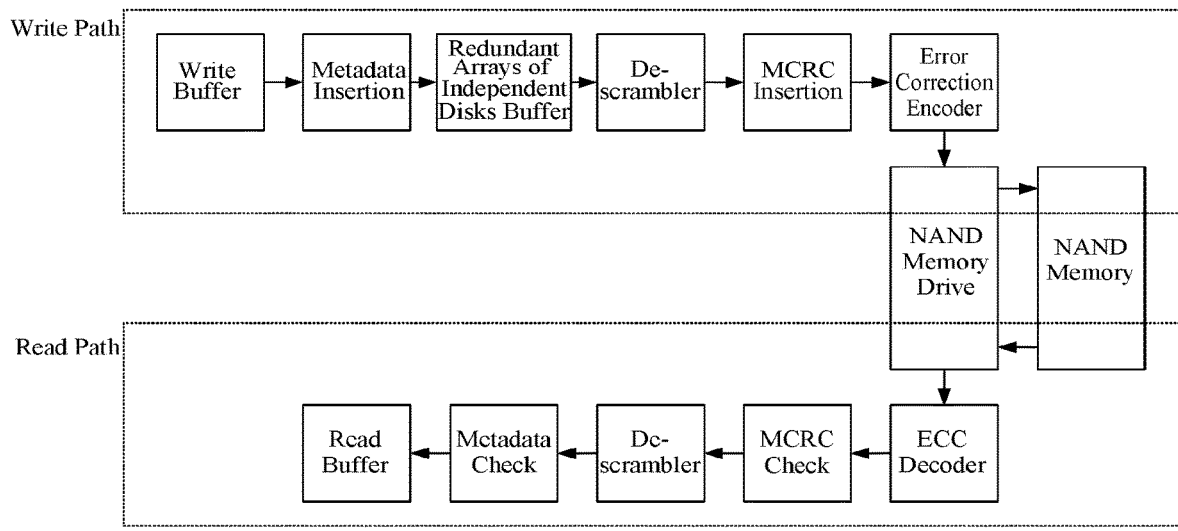
FIG. 3 is a schematic diagram of a write path and a read path of a memory system.

FIG. 3 is a schematic diagram of a write path and a read path of a memory system. As shown in FIG. 3, the write path may include transmitting and storing logic page data in the write buffer, performing metadata insertion on the logic page data, using a redundant arrays of independent disks (RAID) buffer for storing, performing randomization by a de-scrambler, performing media cyclic redundancy check (MCRC) insertion, performing parity check by an error correction code (ECC) encoder, and finally, transmitting and writing the logic page data into a NAND memory by a NAND memory drive. The read path may include transmitting the logic page data by the NAND memory drive to an ECC decoder for decoding, performing MCRC check on the logic page data, performing descrambling by the de-scrambler, performing metadata check, and finally, transmitting the logic page data to the read buffer.

The technical terms involved in the present disclosure have been described above, and related technical backgrounds involved in the present disclosure will be described below.

With the development of the 3D NAND technology, the number of stacked layers in the memory continues to increase. When the number of stacked layers is greater than or equal to 64, there will be no more MLC memory. Although the current mainstream 3D NAND product is the TLC memory, when the number of stacked layers is greater than or equal to 300, the mainstream 3D NAND product would be the QLC memory.

The development cost of new 3D NAND technology nodes is huge, especially when the number of stacked layers becomes greater and greater. In terms of customer demand, there is still a demand for low-bit memory to meet the requirements for better reliability, for example, in the automotive industry. However, this market scale is not large; from the perspective of cost, it is not worthwhile to develop dedicated low-bit memory, for example, when the mainstream NAND is the TLC memory, there is still some disclosure demand for the MLC memory; when the mainstream NAND is the QLC memory, there is still some disclosure demand for the TLC memory and the MLC memory; and from the perspective of disclosures, this is a mismatch.

One solution is to develop universal NAND memories, which support all level cells (e.g., SLC/MLC/TLC/QLC). However, this solution is a huge burden for all development teams, such as design, verification, confirmation, testing, etc. Furthermore, the cost of this work would be three times higher than that of the SLC memory, especially for testing and certification teams.

Figure 4:
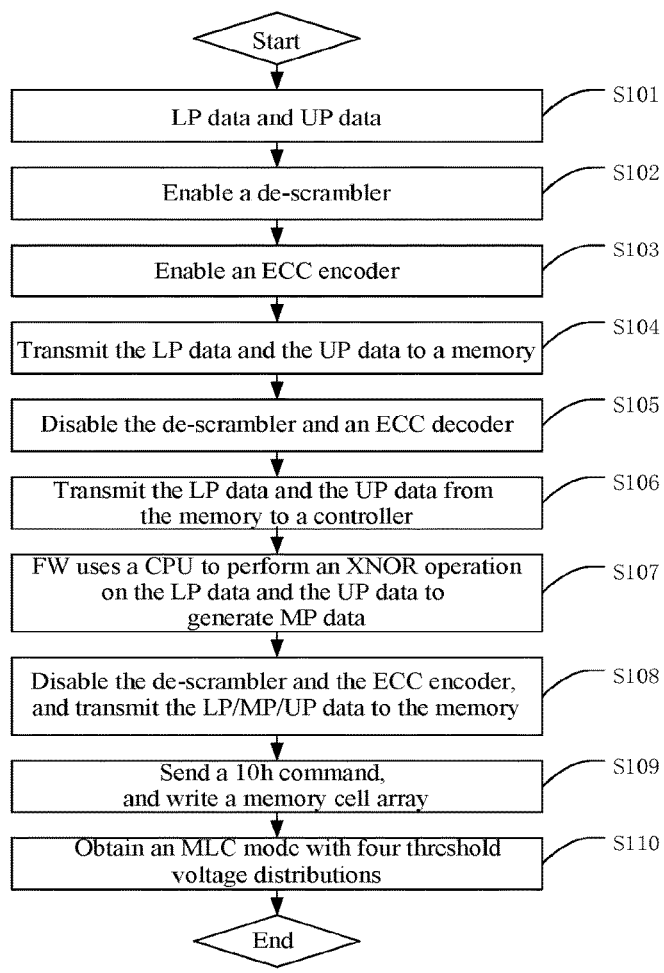
FIG. 4 is a schematic diagram of a flow of a writing method of a memory system.

At present, a memory for storing multi-bit data may be used as a memory for storing few-bit data. FIG. 4 is a schematic diagram of a flow of a writing method of a memory system. The writing method includes at least the following steps:

S101: receiving lower page (LP) data and upper page (UP) data by a CPU in a controller;

S102: enabling a de-scrambler to randomize the LP data and the UP data, wherein the de-scrambler may be used for scrambling;

S103: enabling an ECC encoder to perform parity check on the randomized LP data and UP data;

S104: transmitting the LP data and the UP data to a memory, for example, a page buffer;

S105: disabling the de-scrambler and the ECC decoder, wherein the de-scrambler may also be used for descrambling;

S106: transmitting the LP data and the UP data from the memory to the CPU in the controller;

S107: performing an exclusive NOR (XNOR) operation on the LP data and the UP data by running firmware (FW) of the CPU in the controller, to generate middle page (MP) data; here, the running firmware may be stored in the memory;

S108: disabling the de-scrambler and the ECC encoder, and transmitting the LP/MP/UP data to the memory, for example, the page buffer;

S109: transmitting a writing command (e.g., 10h), and starting to perform a writing operation, for example, writing the LP/MP/UP data from the page buffer into the memory; and S110: obtaining an MLC mode with four threshold voltage distributions.

Figure 5:
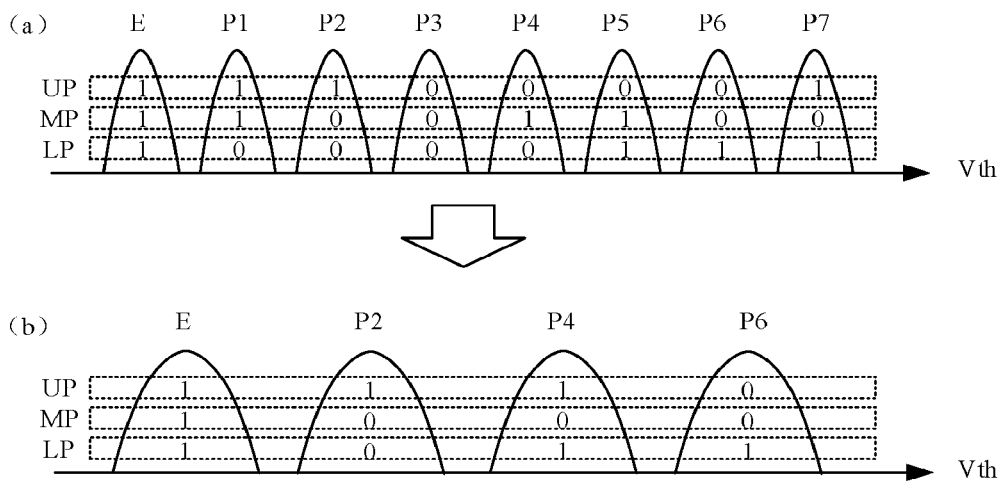
FIG. 5 is a schematic diagram of write states of a memory.

FIG. 5 is a schematic diagram of write states of a memory. FIG. 5(*a*) indicates that the LP/MP/UP data is written into the memory by a normal writing method, 3 bits of data may be stored in the memory cell of the TLC memory, and eight different data states are generated, that is, an erased state E and programmed states P1 to P7. FIG. 5(*b*) indicates that the LP/MP/UP data is written into the memory by the method shown in FIG. 4, 3 bits of data may be stored in the memory cell of the TLC memory, and four different data states are generated, that is, an erased state E and programmed states P2, P4 and P6. That is, at least part of memory space in the TLC memory is used as an MLC by performing the method shown in FIG. 4 to meet the disclosure demands for the MLC memory.

However, the method needs to be executed by the CPU in the controller, resulting in a complex operation mode, and the running firmware is required to use the CPU to perform the exclusive NOR operation on raw data (e.g., the LP data and the UP data), and to generate MP data, resulting in a relatively low efficiency.

Figure 6:
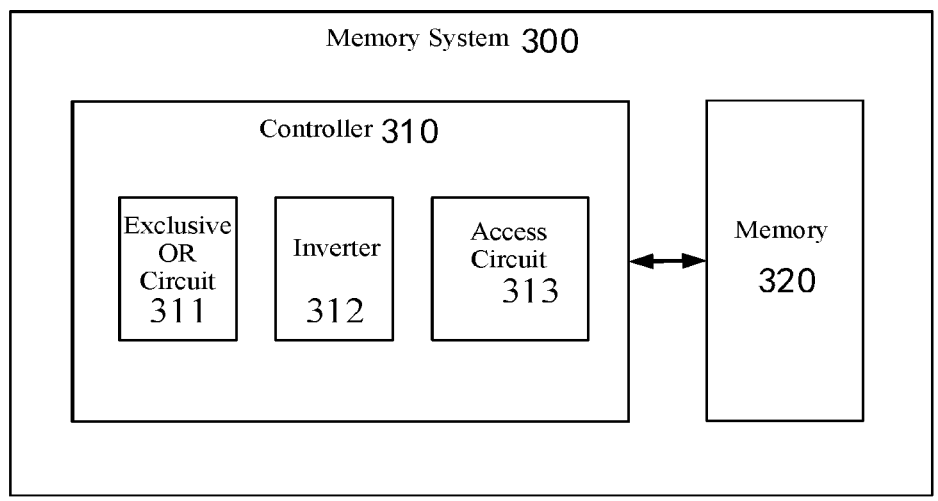
FIG. 6 is a first schematic diagram of a structure of a memory system provided in an embodiment of the present disclosure.

In view of this, the embodiments of the present disclosure provide a memory system. FIG. 6 illustrates a first schematic diagram of a structure of a memory system provided by an embodiment of the present disclosure. The memory system 300 includes a controller 310 and a memory 320 coupled thereto, each memory cell of the memory 320 is used for storing m-bit information, wherein m being a positive integer greater than 1, and the controller 310 including at least one of an exclusive OR circuit 311, an inverter 312 and an access circuit 313. The controller 310 is used for receiving n groups of logic page data, and generating, at different values of m and n, at least one group of logic page data selectively by the at least one of the exclusive OR circuit 311, the inverter 312 and the access circuit 313, wherein n being a positive integer different from m. The controller 310 is further used for transmitting m groups of logic page data to the memory 320 to generate 2n different data states in the memory 320, the m groups of logic page data comprising the n groups of logic page data and the at least one group of logic page data, and the m groups of logic page data comprising m-bit information of a group of memory cells.

The exclusive OR circuit 311 may be a logic circuit for implementing exclusive OR logic in digital logic. For a single logic operation, the exclusive OR circuit 311 may have a plurality of input ends and an output end. A multi-input exclusive OR circuit 311 may be composed of at least one two-input exclusive OR circuit 311. The exclusive OR logic that may be implemented by the exclusive OR circuit 311 may be specifically: if the levels of two inputs are different, the output is a high level 1; and if the levels of the two inputs are the same, the output is a low level 0. In one possible implementation, the exclusive OR circuit 311 includes a redundant arrays of independent disks (RAID) exclusive OR circuit in the controller 310. A redundant arrays of independent disks (RAID) exclusive OR circuit is originally existed in the memory 320, but is not used to generate at least one group of logic page data. The memory system 300 provided in the present disclosure reuses the original redundant arrays of independent disks (RAID) exclusive OR circuit, so there is no need to add a new exclusive OR circuit in the controller 310. Therefore, at least one group of logic page data can be generated at a lower hardware cost. A foundation is provided for implementing a plurality of memory cell modes of the memory 320 and improving the operation efficiency of the memory system 300.

Figure 7:
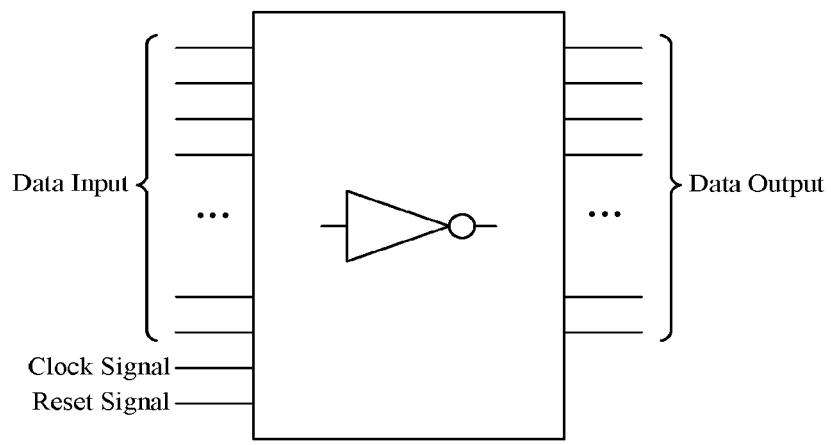
FIG. 7 is a schematic diagram of an inverter provided in an embodiment of the present disclosure.

The inverter 312 may be a logic circuit for implementing non-logic in the digital logic. For a single logic operation, the inverter 312 may have an input end and an output end. The non-logic that may be implemented by the inverter 312 may be such that the level of the output is changed to a level opposite to the input. FIG. 7 is a schematic diagram of an inverter 312 provided by an embodiment of the present disclosure. As shown in FIG. 7, if the data input of the inverter 312 is a high level 1, the data output is a low level 0. If the data input of the inverter 312 is a low level 0, the data output is a high level 1. The input of the inverter 312 may further include a clock signal and a reset signal. In the scheme in which the memory system 300 provided by the embodiments of the present disclosure includes the inverter 312, only the inverter 312 is added to the circuit structure, such that the change to the controller 310 is very simple. Therefore, at least one group of logic page data can be generated at a lower hardware cost. A foundation is provided for implementing a plurality of memory cell modes of the memory 320 and improving the operation efficiency of the memory system 300.

The access circuit 313 may be a circuit for performing a data transmission function. Specifically, the access circuit 313 may perform operations such as data filling, or data copying, or seeking extreme values for data, etc. In one possible implementation, the access circuit 313 includes a direct memory access (DMA) circuit in the controller 310. A direct memory access circuit is originally existed in the memory 320, but is not used to generate at least one group of logic page data, and the memory system 300 provided by the present disclosure reuses the original DAM circuit, so there is no need to add a new access circuit in the controller 310. Therefore, at least one group of logic page data can be generated at a lower hardware cost. A foundation is provided for implementing a plurality of memory cell modes of the memory 320 and improving the operation efficiency of the memory system 300.

In addition, if the memory 320 is an MLC memory, m=2; if the memory 320 is a TLC memory, m=3; and if the memory 320 is a QLC memory, m=4. If the memory 320 is used as an SLC memory, n=1; if the memory 320 is used as an MLC memory, n=2; and if the memory 320 is used as a TLC memory, n=3. In one possible implementation, n is less than m.

Furthermore, one group of memory cells may be memory cells in one logic page. One logic page may be composed of memory cells belonging to a same word line (WL). The m groups may correspond to the number of logic pages. The number of logic pages is related to the capability of the memory cells in the logic page for storing bit data. For example, each memory cell of the QLC memory stores four-bit information, the number of logic pages thereof is 4, the m groups of logic page data corresponding thereto are four groups of logic page data, which may be LP data, MP data, UP data and extra page (XP) data respectively, and the n groups of logic page data corresponding thereto are at least one of the LP data, MP data, UP data and extra page (XP) data.

In one example, the memory 320 is an MLC memory, when a part of memory space in the MLC memory is required to be used as an SLC, n=1, m=2, and the controller 310 is used for receiving LP data, generating MP data, and transmitting the LP data and the MP data to the memory 320 to generate 21 different data states in the memory 320.

In one example, the memory 320 is a TLC memory, when a part of memory space in the TLC memory is required to be used as an MLC, n=2, m=3, and the controller 310 is used for receiving LP data and MP data, generating UP data, and transmitting the LP data, the MP data and the UP data to the memory 320 to generate 22 different data states in the memory 320.

In one example, the memory 320 is a TLC memory, when a part of memory space in the TLC memory is required to be used as an SLC, n=1, m=3, and the controller 310 is used for receiving LP data, generating MP data, and at least transmitting the LP data and the MP data to the memory 320 to generate 21 different data states in the memory 320.

In one example, the memory 320 is a QLC memory, when a part of memory space in the QLC memory is required to be used as a TLC, n=3, m=4, and the controller 310 is used for receiving LP data, MP data and UP data, generating XP data, and transmitting the LP data, the MP data, the UP data and the XP data to the memory 320 to generate 23 different data states in the memory 320.

In one example, the memory 320 is a QLC memory, when a part of memory space in the QLC memory is required to be used as an MLC, n=2, m=4, and the controller 310 is used for receiving LP data and MP data, generating UP data, and at least transmitting the LP data, the MP data and the UP data to the memory 320 to generate 22 different data states in the memory 320.

In one example, the memory 320 is a QLC memory, when a part of memory space in the QLC memory is required to be used as an SLC, n=1, m=4, and the controller 310 is used for receiving LP data, generating MP data, and at least transmitting the LP data and the MP data to the memory 320 to generate 21 different data states in the memory 320.

In one possible implementation, the memory system 300 provided by the embodiments of the present disclosure may be applied to different types of NAND Gray codes, such as a typical 1248 Gray code, a 3444 Gray code, a 124 Gray code, a 233 Gray code, and the like.

In the embodiments of the present disclosure, the controller 310 is used for generating at least one group of logic page data selectively by the at least one of the exclusive OR circuit 311, the inverter 312 and the access circuit 313, and transmitting the at least one group of logic page data and the n groups of logic page data received to the memory 320 to generate 2n different data states in the memory 320, that is, a part of memory space of the memory 320 may be used as at least one of an SLC, an MLC, a TLC and a QLC. In this way, the memory 320 can be flexibly configured to enable the same to implement multiple memory cell modes, and can simultaneously have the advantages of fast write speed, high reliability, high storage capacity and low cost and the like.

Further, compared with having the CPU in the controller 310 perform logical operations, in the embodiments of the present disclosure, it is a simpler scheme that generates the at least one group of logic page data by the at least one of hardware modules such as the exclusive OR circuit 311, the inverter 312, the access circuit 313 and the like in the controller 310. While multiple memory cell modes are implemented, it helps to improve the operational efficiency of the memory system 300. Moreover, compared with the scheme of developing a universal NAND memory, the scheme in which the memory system 300 provided by the embodiments of the present disclosure uses the hardware modules is more friendly, and can be compatible with the existing NAND protocol, thereby being helpful to reduce the development costs.

Figure 8:
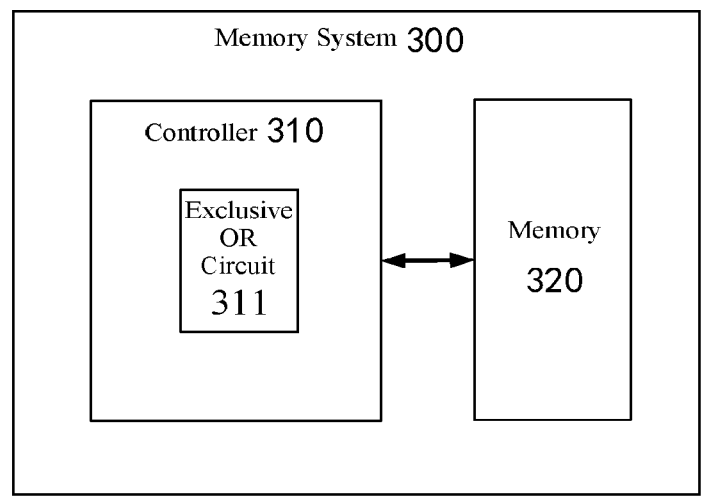
FIG. 8 is a second schematic diagram of a structure of a memory system provided in an embodiment of the present disclosure.

In one possible implementation, as shown in FIG. 8, the controller 310 includes the exclusive OR circuit 311, the circuit selected by the controller 310 includes the exclusive OR circuit 311, and the controller 310 is used for performing an exclusive OR operation on the n groups of logic page data by the exclusive OR circuit 311 to obtain a first group of logic page data, wherein the at least one group of logic page data may include the first group of logic page data.

Figure 9:
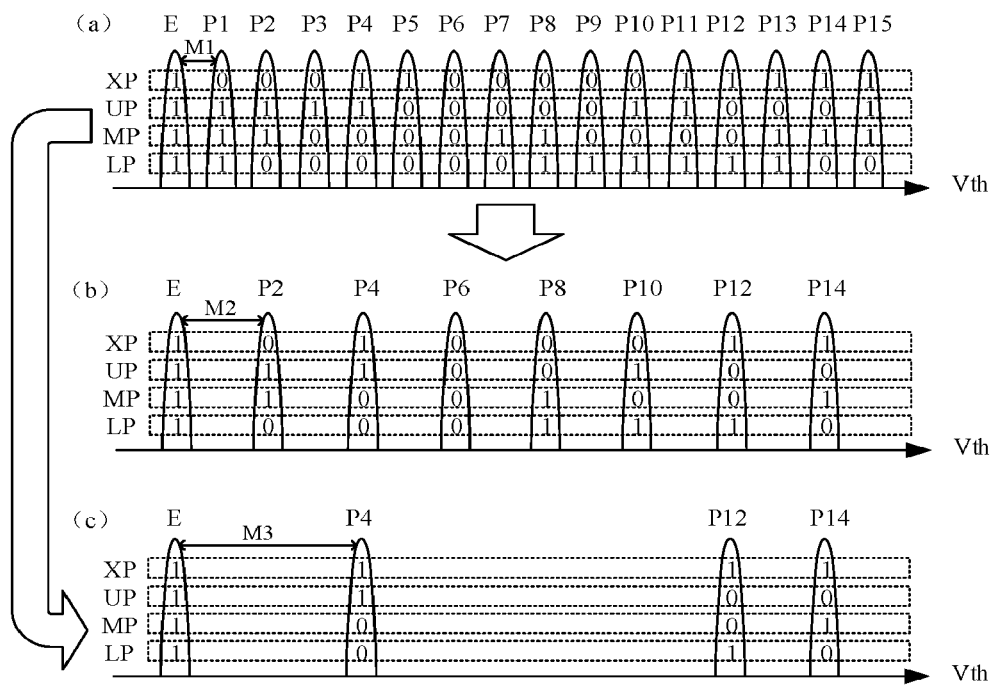
FIG. 9 is a schematic diagram of write states of another memory.

The implementation may be applied to a part of scenarios in which a difference value between m and n is 1, and the first group of logic page data may include an (n+1)th group of logic page data. For example, FIG. 9 is a schematic diagram of write states of another memory. As shown in FIG. 9, a 3444 Gray code is used as an example for illustration. FIG. 9(a) indicates that the memory 320 is a QLC memory and is normally used as a QLC memory. Each memory cell stores 4 bits of data, and generates 16 different data states, that is, an erased state E and programmed states P1 to P15, wherein the LP data is a (1100000011111100) sequence, the MP data is a (1110000110000111) sequence, the UP data is a (1111100000110001) sequence, and the XP data is a (1000110000011111) sequence. FIG. 9(b) indicates that the memory 320 is used as a TLC memory. According to the memory system 300 provided by the embodiments of the present disclosure, the controller 310 may be used for receiving three groups of logic page data: LP data, MP data and UP data, and perform the exclusive OR operation on the LP data, the MP data and the UP data by the exclusive OR circuit 311 to obtain XP data. Specifically, the exclusive OR operation may be XP=(LP XOR MP) XOR UP, wherein XOR is a symbol for exclusive OR operation. The controller 310 may also be used for transmitting the LP data, the MP data, the UP data and the XP data to the memory 320 to generate 8 different data states in the memory 320, comprising an erased state E (1111), a programmed state P2 (0110), a programmed state P4 (1100), a programmed state P6 (0000), a programmed state P8 (0011), a programmed state P10 (0101), a programmed state P12 (1001), and a programmed state P14 (1010), respectively.

Figure 10:
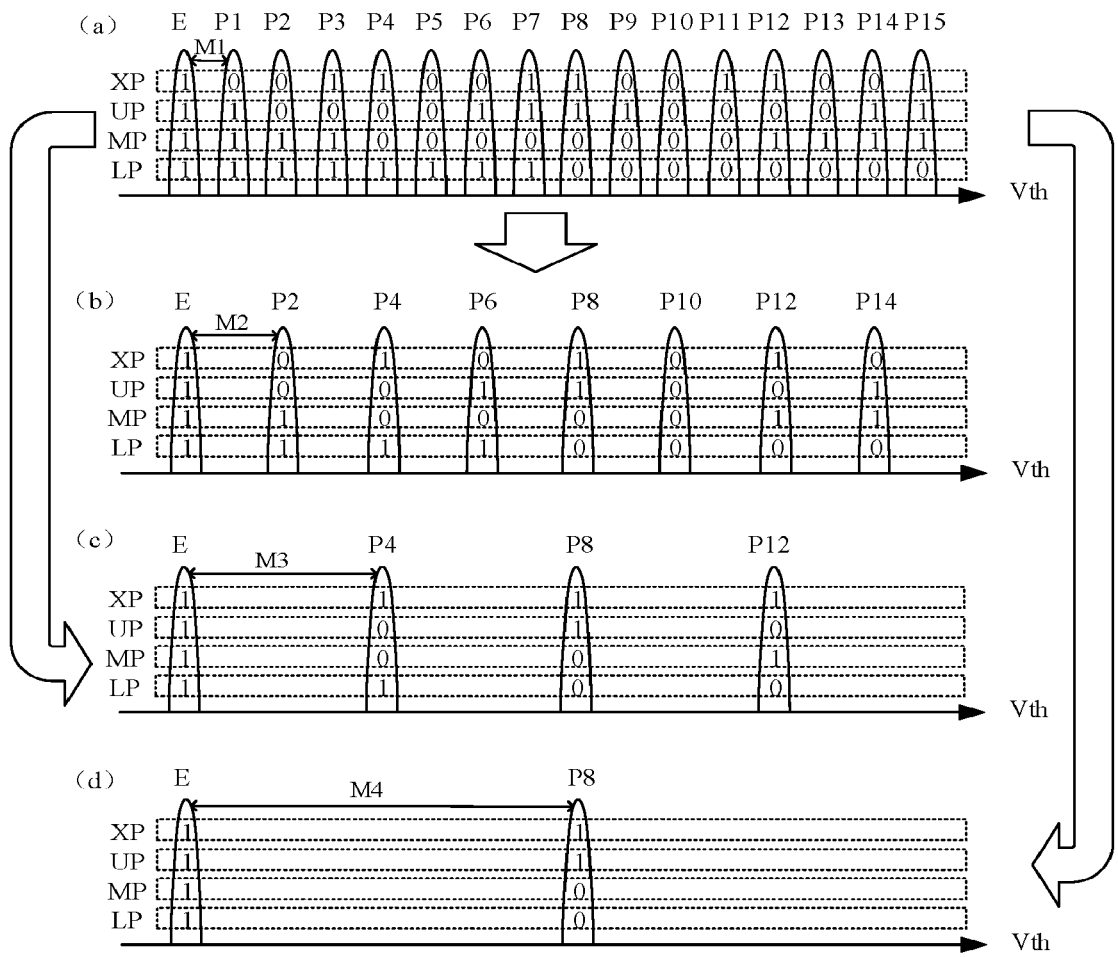
FIG. 10 is a schematic diagram of write states of yet another memory.

FIG. 10 is a schematic diagram of write states of yet another memory. As shown in FIG. 10, the 1248 Gray code is used as an example for illustration. FIG. 10(a) indicates that the memory 320 is a QLC memory and is normally used as a QLC memory. Each memory cell stores 4 bits of data, and generates 16 different data states, that is, an erased state E and programmed states P1 to P15, wherein the LP data is a (1111111100000000) sequence, the MP data is a (1111000000001111) sequence, the UP data is a (1100001111000011) sequence, and the XP data is a (1001100110011001) sequence. FIG. 10(b) indicates that the memory 320 is used as a TLC memory. According to the memory system 300 provided by the embodiments of the present disclosure, the controller 310 may be used for receiving three groups of logic page data: LP data, MP data and UP data, and performing the exclusive OR operation on the LP data, the MP data and the UP data by the exclusive OR circuit 311 to obtain XP data. Specifically, the exclusive OR operation may be XP=(LP XOR MP) XOR UP. The manner in which the controller 310 is used for transmitting the logic page data to the memory 320 to generate data states in the memory 320 may refer to FIG. 9(b), and thus will not be repeated here in the present disclosure. As can be seen from FIG. 10, M1 represents a threshold voltage difference between two adjacent data states when the memory 320 is normally used as a QLC. When a part of memory space in the memory 320 is used as a TLC, the threshold voltage difference M2 between the two adjacent data states is basically the same, that is, a read margin distribution is relatively uniform, which is beneficial to ensuring the accuracy of a reading operation when used as the TLC.

The 3444 Gray code and the 1248 Gray code are used as examples for illustration above to convey the present disclosure to those skilled in the art. However, the embodiments of the present disclosure are not limited to using the LP data, the MP data, the UP data and the XP data as the above sequences. The LP data, the MP data, the UP data and the XP data may also be other sequences consisting of "1" and "0".

In the above examples, it is taken as an example for description that the n groups of logic page data are the LP data, the MP data and the UP data, and the first group of logic page data is the XP data, to convey the present disclosure to those skilled in the art. However, the embodiments of the present disclosure are not limited to that the first group of logic page data is the XP data, for example, the exclusive OR operation may also be performed on the LP data, the MP data and the XP data to obtain the UP data.

In the embodiments of the present disclosure, the controller 310 is used for performing the exclusive OR operation on the n groups of logic page data by the exclusive OR circuit 311 to obtain the first group of logic page data, and transmitting the n groups of logic page data and the first group of logic page data to the memory 320 to generate 2n different data states in the memory 320. For example, when the memory 320 is a QLC, a part of memory space of the memory 320 may be used as a TLC. In this way, the memory 320 has at least two memory cell modes, which is conducive to increasing the disclosure scenarios of the memory 320, and can better meet customer requirements while being compatible with mainstream memories.

Further, compared with having the CPU in the controller 310 perform logical operations, in the embodiments of the present disclosure, it is a simpler scheme that generates the first group of logic page data by the hardware modules such as the exclusive OR circuit in the controller 310. While multiple memory cell modes are implemented, it helps to improve the operational efficiency of the memory system 300. Moreover, compared with the scheme of developing a universal NAND memory, the scheme in which the memory system 300 provided by the embodiments of the present disclosure uses the hardware modules is more friendly, and can be compatible with the existing NAND protocol, thereby being helpful to reduce the development costs.

In one possible implementation, the controller 310 further includes a first buffer. The controller 310 is further used for storing at least one group of logic page data in the m groups of logic page data by the first buffer.

Figure 11:
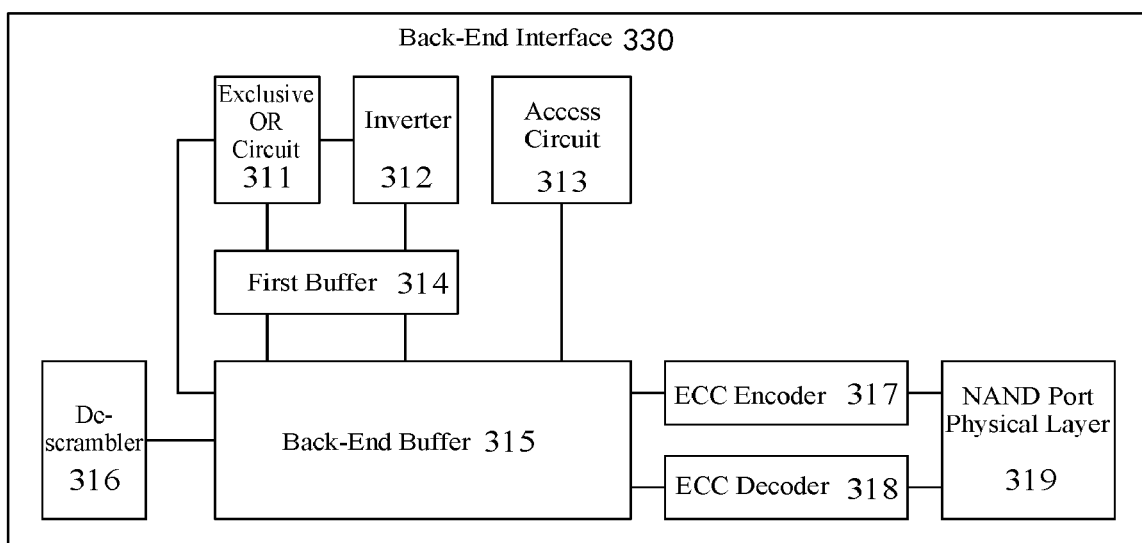
FIG. 11 is a schematic diagram of a structure of a back-end interface provided in an embodiment of the present disclosure.

As shown in FIG. 11, the exclusive OR circuit 311 and the first buffer 314 may be disposed in a back-end interface 330 in the controller 310, and the first buffer 314 may be coupled with the exclusive OR circuit 311. The first buffer 314 may also be used for storing exclusive OR data of the exclusive OR circuit 311, and the exclusive OR data includes data generated in an intermediate step when the exclusive OR circuit 311 performs the exclusive OR operation. Exemplarily, a direct memory access circuit (DMA) circuit, a de-scrambler 316, a back-end buffer 315, an ECC encoder 317, an ECC decoder 318 and a NAND port physical layer 319 may also be disposed in the back-end interface 330.

A data flow direction between the foregoing hardware is described below in conjunction with FIG. 11 and FIG. 12. In one example, the exclusive OR circuit 311 may include a first exclusive OR sub-circuit 301 and a second exclusive OR sub-circuit 302. The de-scrambler 316 is used for receiving the LP data, the MP data and the UP data, randomizing the same, and then transmitting the randomized LP data, MP data and UP data to the back-end buffer 315. The back-end buffer 315 is used for transmitting the received MP data and UP data to the first buffer 314 for storing, and transmitting the received LP data to the first exclusive OR sub-circuit 301. The first buffer 314 is used for transmitting the received MP data to the first exclusive OR sub-circuit

301. The first exclusive OR sub-circuit 301 is used for performing the exclusive OR operation on the received LP data and MP data to obtain exclusive OR data. Specifically, the exclusive OR data=LP XOR MP. The first exclusive OR sub-circuit 301 is further used for transmitting the exclusive OR data to the first buffer 314. The first buffer 314 is further used for transmitting the received UP data and the exclusive OR data to the second exclusive OR sub-circuit 302. The second exclusive OR sub-circuit 302 is used for performing the exclusive OR operation on the received exclusive OR data and the UP data to obtain XP data. Specifically, XP=exclusive OR data XOR UP. The second exclusive OR sub-circuit 302 is further used for transmitting the XP data to the first buffer 314. The DMA is used for reading the XP data from the first buffer 314 into the back-end buffer 315. The back-end buffer 315 is further used for transmitting the LP data, the MP data, the UP data and the XP data to the ECC encoder 317. The ECC decoder 318 is used for receiving the LP data, the MP data, the UP data and the XP data and performing parity check on the same, and transmitting the LP data, the MP data, the UP data and the XP data to the NAND port physical layer 319.

In the above example, the functions of the first exclusive OR sub-circuit 301 and the second exclusive OR sub-circuit 302 may also be implemented by one exclusive OR circuit 311, or, the first exclusive OR sub-circuit 301 and the second exclusive OR sub-circuit 302 may be integrated on one chip for performing the foregoing functions.

In the embodiments of the present disclosure, the controller 310 further includes the first buffer 314, and the controller 310 is used for storing at least one group of logic page data in the m groups of logic page data by the first buffer 314, thereby providing a foundation for implementing a plurality of memory cell modes of the memory 320 and improving the operation efficiency of the memory system 300.

In one possible implementation, the first buffer 314 includes a redundant arrays of independent disks (RAID) buffer in the controller 310. A redundant arrays of independent disks (RAID) buffer is originally existed in the memory 320, for example, the redundant arrays of independent disks (RAID) buffer in FIG. 3, but is not used to generate data storage during the process of generating the at least one group of logic page data. The memory system 300 provided in the present disclosure reuses the original redundant arrays of independent disks (RAID) buffer, so there is no need to add a new buffer in the controller 310. Therefore, the data generated during the process of generating the logic page data can be stored at a lower hardware cost. A foundation is provided for implementing a plurality of memory cell modes of the memory 320 and improving the operation efficiency of the memory system 300.

In one possible implementation, as shown in FIG. 13, the controller 310 includes the exclusive OR circuit 311 and the inverter 312, the circuit selected by the controller 310 includes the exclusive OR circuit 311 and the inverter 312, and the controller 310 is configured to perform, by the exclusive OR circuit 311, the exclusive OR operation on the n groups of logic page data to obtain intermediate data, and perform, by the inverter 312, a NOT operation on the intermediate data to obtain the first group of logic page data, wherein the at least one group of logic page data may include the first group of logic page data.

The implementation may be applied to another part of scenarios in which the difference value between m and n is 1, and the first group of logic page data may include an (n+1)th group of logic page data. For example, FIG. 14 is a schematic diagram of write states of yet another memory. As shown in FIG. 14, the 124 Gray code is taken as an example for description. FIG. 14(*a*) indicates that the memory 320 is a TLC memory and is normally used as a TLC memory. Each memory cell stores 3 bits of data, and generates 8 different data states, that is, an erased state E and programmed states P1 to P7, wherein the LP data is a (11110000) sequence, the MP data is a (11000011) sequence, and the UP data is a (10011001) sequence. FIG. 14(*b*) indicates that: the memory 320 is used as an MLC memory. According to the memory system 300 provided in the embodiments of the present disclosure, the controller 310 may be configured to receive two groups of logic page data: LP data and MP data, and perform, by the exclusive OR circuit 311, the exclusive OR operation on the LP data, and the MP data to obtain intermediate data, and perform the NOT operation on the intermediate data to obtain UP data. Specifically, the exclusive OR operation and the NOT operation may be UP=NOT (LP XOR MP), wherein NOT is a symbol for the NOT operation. The controller 310 may also be configured to transmit the LP data, the MP data and the UP data to the memory 320 to generate 4 different data states in the memory 320, comprising an erased state E (111), a programmed state P2 (001), a programmed state P4 (100), and a programmed state P6 (010) respectively.

The 233 Gray code shown in FIG. 5 may also be applied to the memory system 300 provided in the embodiments of the present disclosure, and the manner for disclosure is the same as that of the 124 Gray code shown in FIG. 14, and thus no details will be repeated here in the present disclosure.

The implementation may also be applied to a part of scenarios in which the difference value between m and n is 2, and the first group of logic page data may include an (n+1)th group of logic page data. For example, as shown in FIG. 9, FIG. 9(*c*) indicates that the memory 320 is used as an MLC memory. According to the memory system 300 provided in the embodiments of the present disclosure, the controller 310 may be configured to receive two groups of logic page data: LP data and MP data, and perform, by the exclusive OR circuit 311, the exclusive OR operation on the LP data and the MP data to obtain intermediate data, and perform the NOT operation on the intermediate data to obtain UP data. Specifically, the exclusive OR operation and the NOT operation may be UP=NOT (LP XOR MP).

The 1248 Gray code shown in FIG. 10 may also be applied to the memory system 300 provided in the embodiments of the present disclosure, and the manner for disclosure is the same as that of the 3444 Gray code shown in FIG. 9, and thus no details will be repeated here in the present disclosure.

In the embodiments of the present disclosure, the controller 310 is configured to perform an operation on the n groups of logic page data by the exclusive OR circuit 311 and the inverter 312 to obtain the first group of logic page data, and transmit the n groups of logic page data and the first group of logic page data to the memory 320 to generate 2n different data states in the memory 320. For example, when the memory 320 is a TLC, a part of memory space of the memory 320 may be used as an MLC. In this way, the memory 320 has at least two memory cell modes, which is conducive to increasing the disclosure scenarios of the memory 320, and can better meet customer requirements while being compatible with mainstream memories.

Further, Further, compared with having the CPU in the controller 310 perform logical operations, in the embodiments of the present disclosure, it is a simpler scheme that generates the first group of logic page data by the hardware modules such as the exclusive OR circuit 311 and the inverter 312 in the controller 310. While multiple memory cell modes are implemented, it helps to improve the operational efficiency of the memory system 300. Moreover, compared with the scheme of developing a universal NAND memory, the scheme in which the memory system 300 provided by the embodiments of the present disclosure uses the hardware modules is more friendly, and can be compatible with the existing NAND protocol, thereby being helpful to reduce the development costs.

In one possible implementation, as shown in FIG. 11, the inverter 312 may be disposed in the back-end interface 330, and the inverter 312 may be coupled with the first buffer 314, and the first buffer 314 may also be configured to store intermediate data. The intermediate data includes output data of the exclusive OR circuit 311 which is input data for the inverter 312.

A data flow direction between the foregoing hardware is described below in conjunction with FIG. 11 and FIG. 15. In one example, the de-scrambler 316 is configured to receive LP data and UP data and randomize the same, and transmit the randomized LP data and UP data to the back-end buffer 315. The back-end buffer 315 is configured to transmit the received UP data to the first buffer 314 for storage, and transmit the received LP data to the exclusive OR circuit 311. The first buffer 314 is configured to transmit the received UP data to the exclusive OR circuit 311. The exclusive OR circuit 311 is configured to perform the exclusive OR operation on the received LP data and UP data to obtain intermediate data. Specifically, the intermediate data=LP XOR UP. The exclusive OR circuit 311 is further configured to transmit the intermediate data to the first buffer 314. The first buffer 314 is further configured to transmit the received intermediate data to the inverter 312. The inverter 312 is configured to perform the NOT operation on the received intermediate data to obtain MP data. Specifically, MP=NOT intermediate data. The inverter 312 is further configured to transmit the MP data to the first buffer 314. The DMA is configured to read the MP data from the first buffer 314 into the back-end buffer 315. The back-end buffer 315 is further configured to transmit the LP data, the UP data and the MP data to the ECC encoder 317. The ECC decoder 318 is configured to receive the LP data, the UP data and the MP data and perform parity check on the same, and transmit the LP data, the UP data and the MP data to the NAND port physical layer 319.

In one possible implementation, on the basis that the circuit selected by the controller 310 includes the exclusive OR circuit 311 and the inverter 312, the circuit selected by the controller 310 further includes the access circuit 313, and the controller 310 is further configured to determine, by the access circuit 313, a filling type of a second group of logic page data, and determine the second group of logic page data from the filling type, wherein the at least one group of logic page data may further include the second group of logic page data.

As shown in FIG. 16, the access circuit 313 may be a DMA, and the DMA may include a DMA register 303 and a DMA engine 304. The DMA register 303 is configured to receive a control command sent by a host, and determine filling type information from the control command. The filling type information may include a designated area of the memory 320 and a filling type thereof, such as the address and the filling type of the second group of logic page data. The DMA engine 304 is configured to receive the filling type information sent by the DMA register 303 to determine the address and the filling type of the second group of logic page data.

The implementation may be applied to a part of scenarios in which the difference value between m and n is 2, and the second group of logic page data may include an (n+2)th group of logic page data. For example, as shown in FIG. 9, FIG. 9(c) indicates that the memory 320 is used as an MLC memory. According to the memory system 300 provided in the embodiments of the present disclosure, the controller 310 may be configured to receive two groups of logic page data: LP data and MP data, and perform an operation on the LP data and the MP data by the exclusive OR circuit 311 to obtain UP data. The controller 310 may also be configured to fill XP data by the access circuit 313, wherein the filling type of the XP data is an all 1 sequence. The controller 310 may also be configured to transmit the LP data, the MP data, the UP data and the XP data to the memory 320 to generate 8 different data states in the memory 320, comprising an erased state E (1111), a programmed state P4 (1100), a programmed state P12 (1001), and a programmed state P14 (1010) respectively.

The 1248 Gray code shown in FIG. 10 may also be applied to the memory system 300 provided in the embodiments of the present disclosure, and the manner for disclosure is the same as that of the 3444 Gray code shown in FIG. 9, and thus no details will be repeated here in the present disclosure. The 8 different data states generated in the memory 320 as shown in FIG. 10(c) respectively include an erased state E (1111), a programmed state P4 (1001), a programmed state P8 (1100), and a programmed state P12 (1010). As can be seen from FIG. 10, when a part of memory space in the memory 320 is used as an MLC, the threshold voltage difference M3 between two adjacent data states is basically the same, that is, a read margin distribution is relatively uniform, which is beneficial to ensuring the accuracy of the reading operation when used as the MLC.

The 3444 Gray code and the 1248 Gray code are taken an example for description above to convey the present disclosure to those skilled in the art. However, the embodiments of the present disclosure are not limited to using the LP data, the MP data, the UP data and the XP data as the above sequences. The LP data, the MP data, the UP data and the XP data may also be other sequences consisting of "1" and "0".

In the above example, it is taken as an example for description that the n groups of logic page data are the LP data and the MP data, the first group of logic page data is the UP data, and the second group of logic page data is the XP data, to convey the present disclosure to those skilled in the art. However, the embodiments of the present disclosure are not limited to that the first group of logic page data is the UP data and the second group of logic page data is the XP data, for example, the exclusive OR operation may also be performed on the LP data and the MP data to obtain the MP data, or, the UP data may also be filled.

In the embodiments of the present disclosure, the controller 310 is further configured to determine, by the access circuit 313, the second group of logic page data, and transmit the n groups of logic page data, the first group of logic page data and the second group of logic page data to the memory 320 to generate 2n different data states in the memory 320. In this way, the memory 320 has at least two memory cell modes, which is conducive to increasing the disclosure scenarios of the memory 320, and can better meet customer requirements while being compatible with mainstream memories.

Further, compared with having the CPU in the controller 310 perform logical operations, in the embodiments of the present disclosure, it is a simpler scheme that generates the first group of logic page data by the hardware modules such as the exclusive OR circuit 311, the inverter 312, and the access circuit 313 in the controller 310. While multiple memory cell modes are implemented, it helps to improve the operational efficiency of the memory system 300. Moreover, compared with the scheme of developing a universal NAND memory, the scheme in which the memory system 300 provided by the embodiments of the present disclosure uses the hardware modules is more friendly, and can be compatible with the existing NAND protocol, thereby being helpful to reduce the development costs.

In another possible implementation, as shown in FIG. 17, the controller 310 includes the access circuit 313, the circuit selected by the controller 310 includes the access circuit 313, and the controller 310 is configured to copy, by the access circuit 313, one group of logic page data in the n groups of logic page data to obtain the first group of logic page data, wherein the at least one group of logic page data may include the first group of logic page data.

The implementation may be applied to a part of scenarios in which the difference value between m and n is 3, and the first group of logic page data may include an (n+1)th group of logic page data. For example, FIG. 10(*d*) indicates that the memory 320 is an SLC memory 320. According to the memory system 300 provided in the embodiments of the present disclosure, the controller 310 may be configured to receive one group of logic page data: LP data, and copy the LP data by the access circuit 313 to obtain MP data. That is, MP=LP.

In the embodiments of the present disclosure, the controller 310 is configured to perform, by the access circuit 313, a copy operation on the n groups of logic page data to obtain the first group of logic page data, and transmit the n groups of logic page data and the first group of logic page data to the memory 320 to generate 2n different data states in the memory 320. In this way, the memory 320 has at least two memory cell modes, which is conducive to increasing the disclosure scenarios of the memory 320, and can better meet customer requirements while being compatible with mainstream memories.

Further, compared with having the CPU in the controller 310 perform logical operations, in the embodiments of the present disclosure, it is a simpler scheme that generates the first group of logic page data by the hardware modules such as the access circuit 313 in the controller 310. While multiple memory cell modes are implemented, it helps to improve the operational efficiency of the memory system 300. Moreover, compared with the scheme of developing a universal NAND memory, the scheme in which the memory system 300 provided by the embodiments of the present disclosure uses the hardware modules is more friendly, and can be compatible with the existing NAND protocol, thereby being helpful to reduce the development costs.

In another possible implementation, on the basis that the circuit selected by the controller 310 includes the access circuit 313, the controller 310 is further configured to determine, by the access circuit 313, a filling type of a second group of logic page data, and determine the second group of logic page data from the filling type, wherein the at least one group of logic page data may further include the second group of logic page data.

As shown in FIG. 16, the access circuit 313 may be a DMA, and the DMA may include a DMA register 303 and a DMA engine 304. The DMA register 303 is configured to receive a control command sent by a host, and determine filling type information from the control command. The filling type information may include a designated area of the memory 320 and a filling type thereof, such as the address and the filling type of the second group of logic page data. The DMA engine 304 is configured to receive the filling type information sent by the DMA register 303 to determine the address and the filling type of the second group of logic page data.

The implementation may be applied to a part of scenarios in which the difference value between m and n is 3, and the second group of logic page data may include an (n+2)th group of logic page data and an (n+3)th group of logic page data. For example, FIG. 10(*d*) indicates that the memory 320 is used as an SLC memory. According to the memory system 300 provided in the embodiments of the present disclosure, the controller 310 may be configured to receive one group of logic page data: LP data, and copy the LP data by the access circuit 313 to obtain MP data. The controller 310 may also be configured to fill UP data and XP data by the access circuit 313, wherein the filling type of the UP data and the XP data is an all 1 sequence. The controller 310 may also be configured to transmit the LP data, the MP data, the UP data and the XP data to the memory 320 to generate 2 different data states in the memory 320, comprising an erased state E (1111), and a programmed state P8 (1100) respectively. As can be seen from FIG. 10, when a part of memory space in the memory 320 is used as an SLC, the threshold voltage difference M4 between the erased state E and the programmed state P8 is relatively large, thereby being beneficial to ensuring the accuracy of the reading operation when used as the SLC.

The 1248 Gray code is taken an example for description above to convey the present disclosure to those skilled in the art. However, the embodiments of the present disclosure are not limited to using the LP data, the MP data, the UP data and the XP data as the above sequences. The LP data, the MP data, the UP data and the XP data may also be other sequences consisting of "1" and "0".

In the above example, it is taken as an example for description that the n groups of logic page data are the LP data, the first group of logic page data is the MP data, and the second group of logic page data is the UP data and the XP data, to convey the present disclosure to those skilled in the art. However, the embodiments of the present disclosure are not limited to that the first group of logic page data is the MP data, and the second group of logic page data is the UP data and the XP data, for example, the LP data may also be copied to obtain the UP data, or, the MP data may also be filled.

In the embodiments of the present disclosure, the controller 310 is further configured to determine, by the access circuit 313, the second group of logic page data, and transmit the n groups of logic page data, the first group of logic page data and the second group of logic page data to the memory 320 to generate 2n different data states in the memory 320. In this way, the memory 320 has at least two memory cell modes, which is conducive to increasing the disclosure scenarios of the memory 320, and can better meet customer requirements while being compatible with mainstream memories.

Further, compared with the solution of performing the logic operation by the CPU in the controller 310, in the embodiments of the present disclosure, the solution of generating the first group of logic page data by hardware modules such as the access circuit 313 and the like in the controller 310 is simpler. While a plurality of memory cell modes are implemented, it is conducive to improving the operation efficiency of the memory system 300. Moreover, compared with the solution of developing the universal NAND memory, the solution in which the memory system 300 provided by the embodiments of the present disclosure uses the hardware modules is more friendly, and can be compatible with the existing NAND protocol, thereby being conducive to reducing the development costs.

In one possible implementation, the filling type includes one of an all 0 sequence or an all 1 sequence. The filling type may also be another preset sequence including 0 or 1, which is not limited in the present disclosure. By filling at least one group of logic page data with the sequence such as the all 0 sequence or the all 1 sequence or the like, a foundation is provided for implementing a plurality of memory cell modes of the memory 320 and improving the operation efficiency of the memory system 300.

In one possible implementation, the controller 310 may also be configured to first determine, by the access circuit 313, the first group of logic page data, and then copy, by the access circuit 313, the n groups of logic page data or the first group of logic page data to obtain the second group of logic page data. In one possible implementation, the controller 310 may also be configured to first determine, by the access circuit 313, the first group of logic page data, or first copy, by the access circuit 313, then groups of logic page data to obtain the first group of logic page data, and then perform, by the exclusive OR circuit 311, or the exclusive OR circuit 311 and the inverter 312, an operation on the n groups of logic page data and the first group of logic page data to obtain the second group of logic page data. The sequence of each hardware module for performing the operation is not limited in the present disclosure.

When the memory system 300 provided in the embodiments of the present disclosure is used, it is taken as an example for description that the memory 320 is a TLC, but is used as an MLC. Referring to the write path shown in FIG. 3, after the LP data and UP data are parity-checked by the ECC encoder 317, the LP data and the UP data are saved in a buffer area of the controller 310, and the step of transmitting and writing the LP data and the UP data into the NAND memory by the NAND memory drive is not performed temporarily. The MP data is generated by the hardware module in the controller 310 instead of being directly transmitted from a write buffer area. When the LP data, the UP data and the MP data are present in the controller 310, the step of transmitting and writing the LP data, the UP data and the MP data into the NAND memory by the NAND memory drive is then performed.

As shown in FIG. 6, the embodiments of the present disclosure further provide a controller 310. The controller 310 is coupled with a memory 320, each memory cell of the memory 320 is configured to store m-bit information, m is a positive integer greater than 1, and the controller 310 includes at least one of an exclusive OR circuit 311, an inverter 312 and an access circuit 313. The controller 310 is configured to receive n groups of logic page data, and generate, at different values of m and n, at least one group of logic page data selectively by the at least one of the exclusive OR circuit 311, the inverter 312 and the access circuit 313, wherein n being a positive integer and being less than m. The controller 310 is further configured to transmit the m groups of logic page data to the memory 320 to generate 2n different data states in the memory 320, the m groups of logic page data comprising the n groups of logic page data and the at least one group of logic page data, and the m groups of logic page data comprising m-bit information of a group of memory cells.

In one possible implementation, the exclusive OR circuit 311 includes a redundant arrays of independent disks (RAID) exclusive OR circuit 311 in the controller 310.

In one possible implementation, the access circuit 313 includes a direct memory 320 access circuit 313 in the controller 310.

In one possible implementation, the circuit selected by the controller 310 includes the exclusive OR circuit 311, and the controller 310 is configured to perform, by the exclusive OR circuit 311, an exclusive OR operation on the n groups of logic page data to obtain a first group of logic page data.

In one possible implementation, the circuit selected by the controller 310 includes the exclusive OR circuit 311 and the inverter 312, and the controller 310 is configured to perform, by the exclusive OR circuit 311, the exclusive OR operation on the n groups of logic page data to obtain intermediate data, and perform, by the inverter 312, a NOT operation on the intermediate data to obtain the first group of logic page data.

In one possible implementation, the circuit selected by the controller 310 further includes the access circuit 313, and the controller 310 is further configured to determine, by the access circuit 313, a filling type of a second group of logic page data, and determine the second group of logic page data from the filling type.

In one possible implementation, the circuit selected by the controller 310 includes the access circuit 313, and the controller 310 is configured to copy, by the access circuit 313, one group of logic page data in the n groups of logic page data to obtain the first group of logic page data.

In one possible implementation, the controller 310 is further configured to determine, by the access circuit 313, a filling type of a second group of logic page data, and determine the second group of logic page data from the filling type.

The controller 310 provided in the embodiments of the present disclosure may be applied to the above memory system to implement the functions and effects of the above memory system, and since detailed description has been given in the foregoing embodiment of the memory system, details are not described herein again.

In one possible implementation, the controller 310 is designed to operate in a low duty-cycle environment like secure digital cards, compact Flash cards, universal serial bus Flash drives, or other media for use in electronic devices, such as personal computers, digital cameras, mobile phones, etc.

In one possible implementation, the controller 310 is designed to operate in a high duty cycle environment solid state disk or an embedded multimedia card, the high duty cycle environment solid state disk or the embedded multimedia card serves as a data memory of mobile devices such as smartphones, tablet computers, laptop computers, and the like, and an enterprise memory array.

In one possible implementation, the controller 310 and one or more memories 320 may be integrated into various types of memory devices, for example, being included in the same package (e.g., a universal flash memory package or an embedded multimedia card package).

As shown in FIG. 6, the embodiments of the present disclosure further provides a memory 320. The memory 320 is coupled with a controller, each memory cell of the memory 320 is configured to store m-bit information, m is a positive integer greater than 1, and the controller includes at least one of an exclusive OR circuit, an inverter and an access circuit. The memory 320 is configured to receive m groups of logic page data sent by the controller, and generate 2n different data states according to the m groups of logic page data, and n is a positive integer different from m. The m groups of logic page data include at least one group of logic page data and n groups of logic page data received by the controller, the m groups of logic page data include m-bit information of one group of memory cells, and the at least one group of logic page data is generated, at different values of m and n, selectively by at least one of the exclusive OR circuit, the inverter and the access circuit by the controller.

The memory 320 provided in the embodiments of the present disclosure may be applied to the above memory system, and cooperate with the controller in the above memory system to implement the functions and effects of the above memory system, and since detailed description has been given in the foregoing embodiment of the memory system, details are not described herein again.

In one possible implementation, the memory 320 is further configured to receive the m groups of logic page data, and generate 2m different data states according to the m groups of logic page data.

In one example, the memory 320 is a QLC memory, and the memory 320 is further configured to receive four groups of logic page data, and generate 16 different data states according to the four groups of logic page data, that is, normally used as the QLC memory.

The memory 320 provided in the embodiment of the present disclosure may realize the conversion between a plurality of memory cell modes, for example, the memory 320 is a QLC, but is used as an MLC, and the conversion may also be not performed, for example, the memory 320 is a QLC, and is used as a QLC.

In one possible implementation, the memory 320 may include a memory cell array, a page buffer, a row decoder, a column decoder, a voltage generator, a control logic unit, a register, and an input/output circuit.

The memory 320 may be a NAND flash memory, the memory cell array may be a NAND flash memory cell array, wherein the memory cell array is provided in the form of an array of NAND memory strings each extending vertically. In some embodiments, each NAND memory string includes a plurality of memory cells coupled in series and stacked vertically. Each memory cell can hold a continuous, analog value, such as an electrical voltage or charge, which depends on the number of electrons trapped within a region of memory cell. Each memory cell can be either a floating gate type of memory cell including a floating-gate transistor or a charge trap type of memory cell including a charge-trap transistor. In some embodiments, each word line is denoted as a memory page. The size of one memory page in bits may be related to the number of NAND memory strings coupled by the word lines in one memory block. Each word line may include a plurality of control gates (gate electrodes) at each memory cell in the corresponding page, and a gate line for coupling the control gates.

The page buffer may be configured to read data from the memory cell array and write (program) data into the memory cell array according to a control signal from the control logic unit. In one example, the page buffer may store a page of write data (programming data) to be programmed into one memory page of the memory cell array. In another example, the page buffer may perform a programming verification operation to ensure that data has been correctly programmed into the memory cell, which is coupled to a selected word line. In yet another example, the page buffer may also sense the low power signals from bit line that represents a data bit stored in memory cell and amplify the small voltage swing to recognizable logic levels in a read operation. The column decoder may be configured to be controlled by the control logic unit, and select one or more NAND memory strings by applying a bit line voltage generated from the voltage generator.

Row decoder can be configured to be controlled by control logic and select/deselect memory blocks of memory cell array and select/deselect word lines of memory block. Row decoder can be further configured to drive word lines using word line voltages (VWL) generated from voltage generator. In some implementations, row decoder can also select/deselect and drive source select gate lines and drain select gate lines as well. As described in detail below, the row decoder is configured to perform an erasing operation on the memory cell coupled to (one or more) selected word lines. The voltage generator may be configured to be controlled by the control logic unit, and generate a word line voltage (e.g., a read voltage, a write voltage, a pass voltage, a local voltage, a verification voltage, etc.), a bit line voltage and a source line voltage to be supplied to the memory cell array.

The control logic unit may be configured to control the operation of the memory cell array and a page buffer. Registers can be coupled to control logic unit and include status registers, command registers, and address registers for storing status information, command operation codes (OP codes), and command addresses for controlling. The input/output circuit can be coupled to control logic unit and act as a control buffer to buffer and relay control commands received from a host to the control logic unit and status information received from control logic unit to the host. The input/output circuit can also be coupled to column decoder via data bus and act as a data interface and a data buffer to buffer and relay the data to and from memory cell array.

Figure 19:
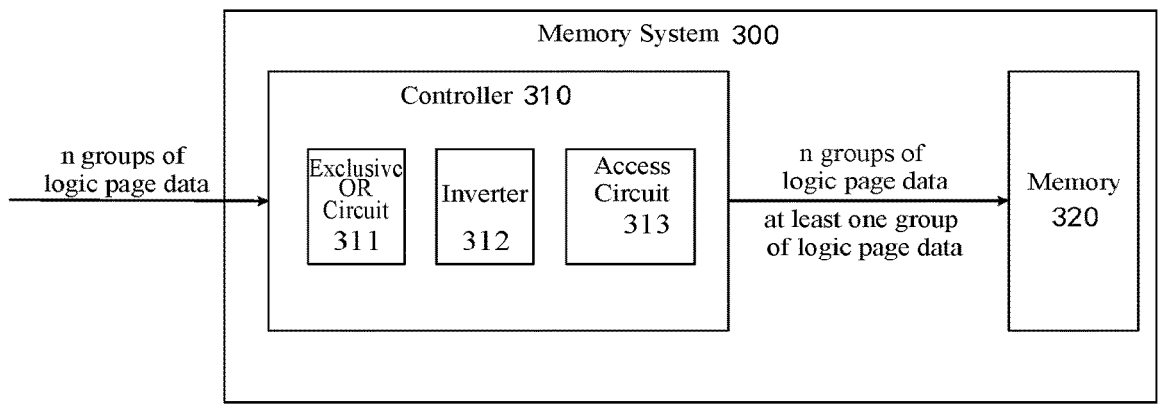
FIG. 19 is a schematic diagram of operations of a memory system provided in an embodiment of the present disclosure.

The embodiments of the present disclosure further provide an operation method of a memory system. As shown in FIG. 18 and FIG. 19, FIG. 18 is a schematic diagram of a flow of an operation method of a memory system provided in an embodiment of the present disclosure, and FIG. 19 is a schematic diagram of operations of a memory system provided in an embodiment of the present disclosure. The method may be applied to the memory system 300 as shown in FIG. 6 including the controller 310 and the memory 320 coupled thereto, and each memory cell of the memory 320 is configured to store m-bit information, and m is a positive integer greater than 1.

S210: receiving n groups of logic page data, and generating, at different values of m and n, at least one group of logic page data selectively by at least one of the exclusive OR circuit 311, the inverter 312 and the access circuit 313, and n being a positive integer different from m. In one possible implementation, n is less than m.

S220: transmitting them groups of logic page data to the memory 320 to generate 2n different data states in the memory 320, the m groups of logic page data including the n groups of logic page data and the at least one group of logic page data, and the m groups of logic page data including m-bit information of one group of memory cells.

In one possible implementation, the exclusive OR circuit 311 includes a redundant arrays of independent disks (RAID) exclusive OR circuit in the controller 310. In one possible implementation, the access circuit 313 includes a direct memory access circuit in the controller 310.

In one possible implementation, the step of generating at least one group of logic page data selectively by at least one of the exclusive OR circuit 311, the inverter 312 and the access circuit 313 may include: selecting the exclusive OR circuit 311, and performing, by the exclusive OR circuit 311, an exclusive OR operation on the n groups of logic page data to obtain a first group of logic page data.

In one possible implementation, the step of generating at least one group of logic page data selectively by at least one of the exclusive OR circuit 311, the inverter 312 and the access circuit 313 may include: selecting the exclusive OR circuit 311 and the inverter 312, and performing, by the exclusive OR circuit 311, the exclusive OR operation on the n groups of logic page data to obtain intermediate data, and performing, by the inverter 312, a NOT operation on the intermediate data to obtain the first group of logic page data. In one possible implementation, the method further includes: further selecting the access circuit 313, and determining, by the access circuit 313, a filling type of the second group of logic page data, and determining the second group of logic page data from the filling type. In one possible implementation, the filling type includes one of an all 0 sequence or an all 1 sequence.

In one possible implementation, the step of generating at least one group of logic page data selectively by at least one of the exclusive OR circuit 311, the inverter 312 and the access circuit 313 may include: selecting the access circuit 313, and copying, by the access circuit 313, one group of logic page data in then groups of logic page data to obtain the first group of logic page data. In one possible implementation, the method may further include determining, by the access circuit 313, a filling type of a second group of logic page data, and determining the second group of logic page data from the filling type. In one possible implementation, the filling type includes one of an all 0 sequence or an all 1 sequence.

In one possible implementation, the controller 310 further includes a first buffer, and the method may further include: storing, by the first buffer, at least one group of logic page data in the m groups of logic page data. In one possible implementation, the first buffer includes a redundant arrays of independent disks (RAID) buffer in the controller 310.

The operation method of the memory system 300 provided in the embodiments of the present disclosure may be applied to the above memory system 300 to implement the functions and effects of the above memory system 300, and since detailed description has been given in the foregoing embodiment of the memory system 300, details are not described herein again.

Figure 20:
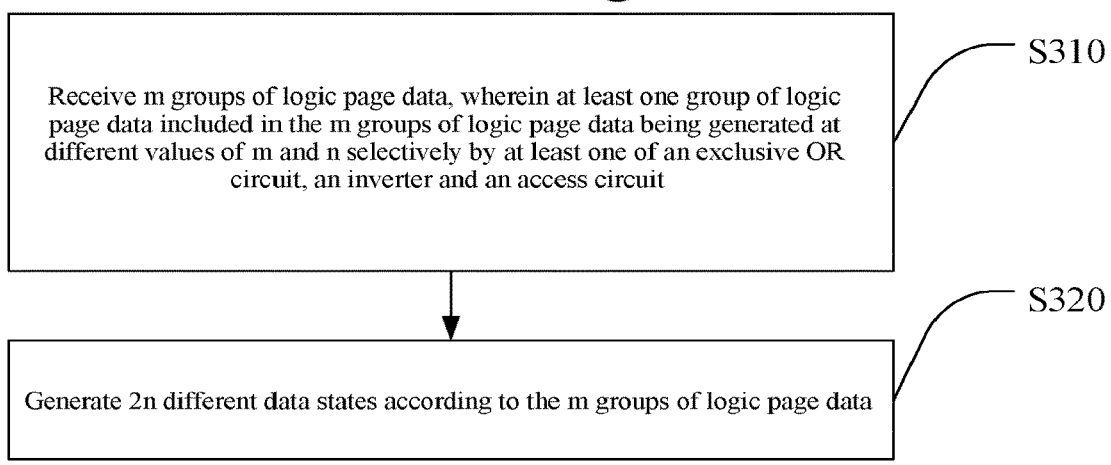
FIG. 20 is a schematic diagram of a flow of an operation method of a memory provided in an embodiment of the present disclosure.

The embodiments of the present disclosure further provide an operation method of a memory. As shown in FIG. 20, FIG. 20 is a schematic diagram of a flow of an operation method of a memory provided in an embodiment of the present disclosure. Each memory cell of the memory is configured to store m-bit information, m is a positive integer greater than 1. The method includes the following steps.

S310: receiving m groups of logic page data, wherein them groups of logic page data include at least one group of logic page data and n groups of logic page data, the m groups of logic page data include in-bit information of one group of memory cells, and the at least one group of logic page data is generated at different values of m and n selectively by at least one of an exclusive OR circuit, an inverter and an access circuit.

S320: generating 2n different data states according to them groups of logic page data.

In one possible implementation, the memory is further configured to receive the m groups of logic page data, and generate 2m different data states according to the m groups of logic page data.

The operation method of the memory provided in the embodiments of the present disclosure may be applied to the above memory to implement the functions and effects of the above memory, and since detailed description has been given in the foregoing embodiment of the memory, details are not described herein again.

Figure 21:
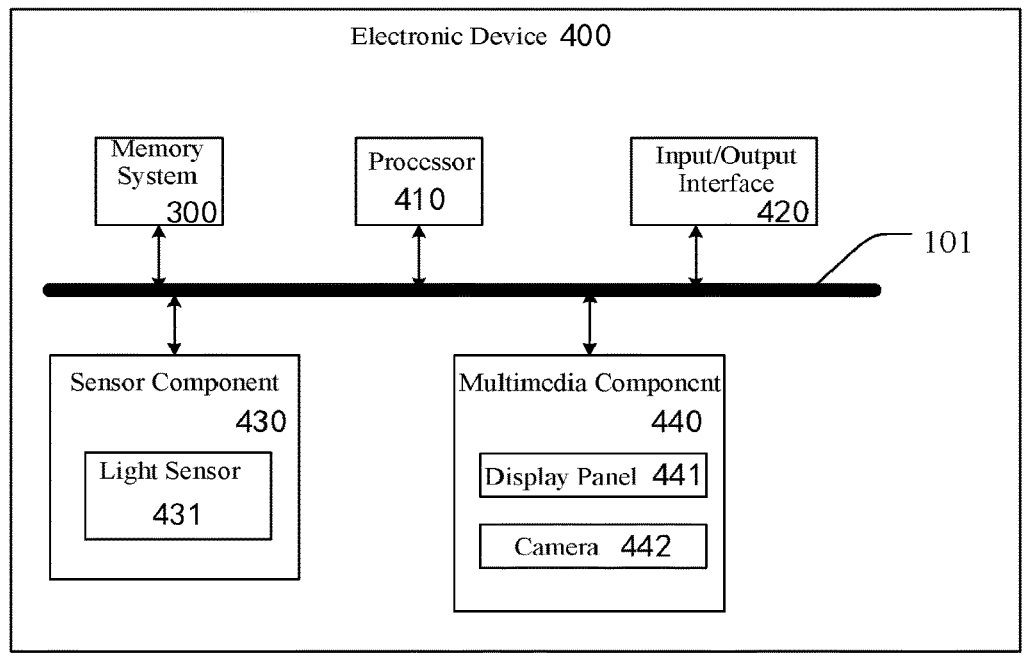
FIG. 21 is a schematic diagram of a structure of an electronic device provided in an embodiment of the present disclosure.

The embodiments of the present disclosure further provide an electronic device. As shown in FIG. 21, FIG. 21 is a schematic diagram of a structure of an electronic device provided in an embodiment of the present disclosure. The electronic device 400 may include one or more memory systems 300 in FIG. 6.

The electronic device 400 may be a mobile phone, a desktop computer, a laptop computer, a tablet, a vehicle computer, a gaming console, a printer, a positioning device, a wearable electronic device 400, a smart sensor, a virtual reality (VR) device, an argument reality (AR) device, or any other suitable electronic devices 400 having storage therein. The electronic device 400 may further include a processor 410, an input/output interface, a sensor component 430, and a multimedia component 440.

The processor 410 is a control center of the electronic device 400, various parts of the entire device are connected by using various interfaces and lines, and various functions and processing data of the electronic device 400 are executed by running or executing software programs and/or software modules stored in the memory system 300 and calling data stored in the memory system 300 to perform overall monitoring on the electronic device 400. In some feasible embodiments, the processor 410 may be a single-processor 410 structure, a multi-processor 410 structure, a single-thread processor 410, a multi-threaded processor 410, etc. In some feasible embodiments, the processor 410 may include at least one of a central processor 410 unit, a general-purpose processor 410, a digital signal processor 410, a neural network processor 410, a graphics processing unit (GPU), an image signal processor 410, a microcontroller, or a microprocessor 410, etc. In addition, the processor 410 may further include other hardware circuits or accelerators, such as an disclosure-specific integrated circuit, a field programmable gate array or other programmable logic devices, transistor logic devices, hardware components, or any combination thereof. It may implement or execute various exemplary logic blocks, modules and circuits described in combination with the disclosure of the present disclosure. The processor 410 may also be a combination for implementing a computing function, for example, including a combination of one or more microprocessors 410, a combination of the digital signal processor 410 and the microprocessor 410, and the like.

The input/output interface 420 provides an interface between the processor 410 and a peripheral interface module, for example, the peripheral interface module may include a keyboard, a mouse, or a USB (universal serial bus) device, etc. In one possible implementation, the input/output interface 420 may have only one input/output interface 420, and may also have a plurality of input/output interfaces 420.

The sensor component 430 includes one or more sensors for providing state assessments of various aspects for the electronic device 400. The sensor component 430 may include a light sensor 431, such as a complementary metal oxide semiconductor (CMOS) image sensor or a charge coupled device (CCD) image sensor, which is used in an imaging disclosure, that is, being a component of a camera or a camera 442. In the embodiments of the present disclosure, the sensor component 430 may be configured to support the camera 442 in the multimedia component 440 to acquire an image, etc. In addition, the sensor component 430 may further include an acceleration sensor, a gyroscope sensor, a magnetic sensor, a pressure sensor or a temperature sensor, and the sensor component 430 may detect an acceleration/deceleration, an orientation, an opening/closing state of the electronic device 400, the relative positioning of the component, or a temperature change of the electronic device 400, etc.

The multimedia component 440 provides a display panel 441 of an output interface between the electronic device 400 and a user, the display panel 441 may be a touch panel, and when the display panel 441 is a touch panel, the display panel 441 may be implemented as a touch screen to receive an input signal from the user. The touch panel includes one or more touch sensors to sense touch, slide and gestures on the touch panel. The touch sensor may not only sense the boundary of a touch or slide action, but may also detect the duration and pressure associated with the touch or slide action. In addition, the multimedia component 440 further includes at least one camera 442, for example, the multimedia component 440 includes a front camera and/or a rear camera. When the electronic device 400 is in an operation mode, such as a photographing mode or a video mode, the front camera and/or the rear camera may sense an external multimedia signal, and the signal is used for forming an image frame. Each front camera and each rear camera may be a fixed optical lens system or have a focal length and an optical zoom capability.

The electronic device 400 provided in the embodiments of the present disclosure may implement the functions and effects of the above memory system 300, and since detailed description has been given in the foregoing embodiment of the memory system 300, details are not described herein again.

Based on this understanding, the embodiments of the present disclosure further provide a computer program product containing an instruction, the technical solutions of the present disclosure substantially, or the part contributing to the related art, or part of or all the technical solutions may be implemented in the form of a software product, the computer software product is stored in a memory medium, and includes several non-transitory instructions for enabling a computer device (which may be a personnel computer, a server, or a network device or the like) or the memory system therein to execute all or part of the steps of the method in various embodiments of the present disclosure.

It should be understood that, "some embodiments" mentioned throughout the disclosure mean that particular features, structures or characteristics related to the embodiments are included in at least one embodiment of the present disclosure. Thus, "in some embodiments" or "in other embodiments" appearing throughout the disclosure does not necessarily refer to the same embodiment. In addition, these particular features, structures or characteristics may be combined in any suitable manner into one or more embodiments. It should be understood that, in various embodiments of the present disclosure, the magnitude of the serial numbers of the above processes do not mean that the order of the execution sequence, the execution sequence of the processes should be determined by its functions and internal logic, and should not constitute any limitation to the implementation process of the embodiments of the present disclosure. The serial numbers of the above embodiments of the present disclosure are merely for description, and do not represent the advantages and disadvantages of the embodiments.

It should be noted that, here, the terms "include", "contain" or any other variants thereof are intended to cover non-exclusive inclusions, such that a process, a method, an article or an apparatus including a series of elements not only includes those elements, but also includes other elements that are not explicitly listed, or also includes elements inherent to such a process, method, article or apparatus. If there are no more restrictions, the element defined by the sentence "including a . . . " does not exclude the presence of other identical elements in the process, the method, the article or apparatus that includes the element.

In the several embodiments provided by the present disclosure, it should be understood that, the disclosed device and method may be implemented in other manners. The device embodiments described above are merely exemplary, for example, the division of the units is only a division of logic functions, and there may be other division manners in practical implementations, for example, a plurality of units or components may be combined or integrated into another system, or some features may be omitted or not executed. In addition, the displayed or discussed mutual coupling or direct coupling or communication connection between the components may be indirect coupling or communication connection of devices or units by some interfaces, and may be in electrical, mechanical or other forms.

The above units described as separate components may be separated physically or not, components displayed as units may be physical units or not, namely, may be located in one place, and may also be distributed on a plurality of network units; and a part of or all of the units may be selected to implement the purposes of the solutions in the present embodiment according to actual demands.

In addition, the functional units in various embodiments of the present disclosure may be integrated into one processing unit, or each unit is individually used as a unit, or two or more units are integrated into one unit; and the integrated unit may be implemented in the form of hardware, and may also be implemented in the form of hardware plus a software functional unit.

Finally, it should be noted that, the foregoing descriptions are merely specific implementations of the present disclosure, but the protection scope of the present disclosure is not limited thereto, and modifications or substitutions within the technical scope disclosed in the present disclosure shall fall within the protection scope of the present disclosure. Therefore, the protection scope of the present disclosure shall be subject to the protection scope of the claims.

The invention claimed is:

1. A memory system comprising:
   a controller having at least one of an exclusive OR circuit, an inverter and an access circuit; and
   a memory coupled to the controller, each memory cell of the memory being used for storing m-bit information, where m is a positive integer greater than 1,
   wherein, the controller is used for:
   receiving n groups of logic page data, and generating, at different values of m and n, at least one group of logic page data selectively by the at least one of the exclusive OR circuit, the inverter and the access circuit, where n is a positive integer and being less than m, and
   transmitting m groups of logic page data to the memory to generate 2n different data states in the memory, the m groups of logic page data including the n groups of logic page data and the at least one group of logic page data, and the m groups of logic page data including m-bit information of a group of memory cells.

2. The memory system of claim 1, wherein the exclusive OR circuit comprises a redundant arrays of independent disks (RAID) exclusive OR circuit in the controller.

3. The memory system of claim 1, wherein the access circuit comprises a direct memory access circuit in the controller.

4. The memory system of claim 1, wherein the exclusive OR circuit is selected by the controller, and the controller is used for performing an exclusive OR operation on the n groups of logic page data by the exclusive OR circuit to obtain a first group of logic page data.

5. The memory system of claim 1, wherein the exclusive OR circuit and the inverter are selected by the controller, and the controller is used for performing an exclusive OR operation on the n groups of logic page data by the exclusive OR circuit to obtain intermediate data, and performing a NOT operation on the intermediate data by the inverter to obtain the first group of logic page data.

6. The memory system of claim 5, wherein the access circuit is further selected by the controller, and the controller is further used for determining a filling type of a second group of logic page data by the access circuit and determining the second group of logic page data from the filling type.

7. The memory system of claim 1, wherein the access circuit is selected by the controller, and the controller is used for copying a group of logic page data in the n groups of logic page data by the access circuit to obtain a first group of logic page data.

8. The memory system of claim 7, wherein the controller is further used for determining a filling type of a second group of logic page data by the access circuit and determining the second group of logic page data from the filling type.

9. The memory system of claim 1, wherein the controller further comprises a first buffer, and the controller is further used for storing at least one group of logic page data in the m groups of logic page data by the first buffer.

10. The memory system of claim 9, wherein the first buffer comprises redundant arrays of independent disks (RAID) buffer in the controller.

11. A controller that is coupled to a memory with each memory cell of the memory being used for storing m-bit information, where m is a positive integer greater than 1, and the controller including at least one of an exclusive OR circuit, an inverter and an access circuit;
the controller is used for receiving n groups of logic page data, and generating, at different values of m and n, at least one group of logic page data selectively by the at least one of the exclusive OR circuit, the inverter and the access circuit, where n is a positive integer that is less than m; and
the controller is further used for transmitting m groups of logic page data to the memory to generate 2n different data states in the memory, the m groups of logic page data including the n groups of logic page data and the at least one group of logic page data, and the m groups of logic page data comprising m-bit information of a group of memory cells.

12. The controller of claim 11, wherein the exclusive OR circuit comprises a redundant arrays of independent disks (RAID) exclusive OR circuit in the controller.

13. The controller of claim 11, wherein the access circuit comprises a direct memory access circuit in the controller.

14. The controller of claim 11, wherein the exclusive OR circuit is selected by the controller, and the controller is used for performing an exclusive OR operation on the n groups of logic page data by the exclusive OR circuit to obtain a first group of logic page data.

15. An operation method of a memory system that is applied to a memory system comprising a controller and a memory coupled to the controller, and each memory cell of the memory being used for storing m-bit information, where m is a positive integer greater than 1, and the method comprises:
receiving n groups of logic page data, and generating, at different values of m and n, at least one group of logic page data selectively by at least one of an exclusive OR circuit, an inverter and an access circuit, where n is a positive integer and being less than m; and
transmitting m groups of logic page data to the memory to generate 2n different data states in the memory, the m groups of logic page data comprising the n groups of logic page data and the at least one group of logic page data, and the m groups of logic page data comprising m-bit information of a group of memory cells.

16. The operation method of the memory system of claim 15, wherein the exclusive OR circuit comprises a redundant arrays of independent disks (RAID) exclusive OR circuit in the controller.

17. The operation method of the memory system of claim 15, wherein the access circuit comprises a direct memory access circuit in the controller.

18. The operation method of the memory system of claim 15, wherein generating the at least one group of logic page data selectively by the at least one of the exclusive OR circuit, the inverter and the access circuit comprises:
selecting the exclusive OR circuit, and performing an exclusive OR operation on the n groups of logic page data by the exclusive OR circuit to obtain a first group of logic page data.

19. The operation method of the memory system of claim 15, wherein generating the at least one group of logic page data selectively by the at least one of the exclusive OR circuit, the inverter and the access circuit comprises:
selecting the exclusive OR circuit and the inverter, and performing an exclusive OR operation on the n groups of logic page data by the exclusive OR circuit to obtain intermediate data, and performing a NOT operation on the intermediate data by the inverter to obtain the first group of logic page data.

20. The operation method of the memory system of claim 19, wherein the method further comprises:
further selecting the access circuit, and determining a filling type of a second group of logic page data by the access circuit and determining the second group of logic page data from the filling type.

* * * * *